US012772310B2

(12) United States Patent
Liu et al.

(10) Patent No.: US 12,772,310 B2
(45) Date of Patent: Oct. 20, 2026

(54) DUAL WI-FI CONNECTION METHOD AND ELECTRONIC DEVICE

(71) Applicant: HONOR DEVICE CO., LTD., Shenzhen (CN)

(72) Inventors: Zhuang Liu, Shenzhen (CN); Yuren Xiao, Shenzhen (CN); Xin Lv, Shenzhen (CN); Ji Ding, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 960 days.

(21) Appl. No.: 17/909,248

(22) PCT Filed: Oct. 28, 2021

(86) PCT No.: PCT/CN2021/126950

§ 371 (c)(1),
(2) Date: Sep. 2, 2022

(87) PCT Pub. No.: WO2022/089515

PCT Pub. Date: May 5, 2022

(65) Prior Publication Data

US 2023/0087282 A1 Mar. 23, 2023

(30) Foreign Application Priority Data

Oct. 30, 2020 (CN) ......................... 202011194246.9

(51) Int. Cl.
*H04W 76/15* (2018.01)
*H04L 61/5014* (2022.01)

(52) U.S. Cl.
CPC ......... *H04W 76/15* (2018.02); *H04L 61/5014* (2022.05)

(58) Field of Classification Search
None
See application file for complete search history.

(56) References Cited

U.S. PATENT DOCUMENTS 10,560,971 B2 2/2020 Seo et al.
2015/0181486 A1* 6/2015 Vallabhu ........... H04W 36/1443 370/331

(Continued)

FOREIGN PATENT DOCUMENTS

CN 106376057 A 2/2017
CN 106888453 A 6/2017

(Continued)

OTHER PUBLICATIONS

Droms R, "RFC2131:Dynamic Host Configuration protocol", Internetion, Mar. 1, 1997(Mar. 1, 1997).

*Primary Examiner* — Mohammad S Adhami
(74) *Attorney, Agent, or Firm* — WOMBLE BOND DICKINSON (US) LLP

(57) ABSTRACT

Embodiments of this application provide a dual Wi-Fi connection method and an electronic device. While exchanging data with a first access point, a first electronic device in the embodiments of this application may quickly establish a Wi-Fi connection with a second access point based on an association relationship between the first access point and the second access point, and after establishing the Wi-Fi connection with the second access point, exchange data with the first access point and the second access point simultaneously, to effectively shorten a duration taken for accessing the second access point, improve the throughput of the first electronic device and the stability of data transmission, and further improve the user experience.

20 Claims, 20 Drawing Sheets

(56) References Cited

U.S. PATENT DOCUMENTS

| | | | |
|---|---|---|---|
| 2015/0230155 | A1 | 8/2015 | Jeong et al. |
| 2018/0234900 | A1 | 8/2018 | Sankaranarayan et al. |
| 2019/0007719 | A1* | 1/2019 | Gordon .............. H04N 21/4781 |
| 2019/0304584 | A1 | 10/2019 | Savolainen |
| 2020/0154322 | A1* | 5/2020 | Liu ....................... H04W 36/08 |
| 2021/0204340 | A1* | 7/2021 | Hareuveni .......... H04L 61/5014 |
| 2021/0377803 | A1 | 12/2021 | Huang et al. |
| 2022/0022197 | A1* | 1/2022 | Zhang ................... H04L 5/0091 |
| 2022/0191826 | A1 | 6/2022 | Li |

FOREIGN PATENT DOCUMENTS

| | | | |
|---|---|---|---|
| CN | 108476533 | A | 8/2018 |
| CN | 109803325 | A | 5/2019 |
| CN | 110493779 | A | 11/2019 |
| CN | 110611890 | A | 12/2019 |
| CN | 111542133 | A | 8/2020 |
| EP | 4213512 | * | 7/2023 |
| WO | WO2022083386 | * | 10/2020 |

* cited by examiner

TO FIG. 5B

CONT. FROM FIG. 5A

DUAL WI-FI CONNECTION METHOD AND ELECTRONIC DEVICE

CROSS-REFERENCE TO RELATED APPLICATIONS

This application is a National Stage of International Application No. PCT/CN2021/126950, filed Oct. 28, 2021, which claims priority to Chinese Patent Application No. 202011194246.9, filed Oct. 30, 2020, both of which are hereby incorporated by reference in their entireties.

TECHNICAL FIELD

Embodiments of this application relate to the field of terminal devices, and in particular, to a dual wireless fidelity (wireless fidelity, Wi-Fi) connection method and an electronic device.

BACKGROUND

With the development of communication technologies, functions of terminals are increasingly powerful. At present, when a mobile phone with a dual-band Wi-Fi function accesses an access point, if the network performance of the current Wi-Fi connection is poor, for example, a relatively large data transmission latency causes a game screen of the mobile phone to freeze and other problems, the mobile phone can access another access point, and the mobile phone can exchange data with the two access points through two connections, to effectively improve the stability and throughput of Internet access of the mobile phone.

However, in the process in which the mobile phone accesses the another access point, because the access process takes a long time, the user experience is affected.

SUMMARY

To resolve the foregoing technical problems, this application provides a dual Wi-Fi connection method and an electronic device. In this method, an electronic device may quickly establish a Wi-Fi connection with a second access point through an association relationship between a first access point and the second access point while maintaining a first Wi-Fi connection with the first access point, and exchange data with the second access point through a Wi-Fi connection, to shorten a time spent on accessing the second access point, improve the efficiency of accessing the second access point, and improve the user experience.

According to a first aspect, an embodiment of this application provides a dual Wi-Fi connection method. The method includes: exchanging, by a first electronic device, data with a first access point through a first Wi-Fi connection; and establishing, by the first electronic device, a second Wi-Fi connection with a second access point according to an association relationship between the first access point and the second access point in a case that an access condition is met. The association relationship between the first access point and the second access point is recorded when the first electronic device exchanges data with the first access point and the second access point simultaneously last time. It may also be understood that the association relationship is recorded when the first electronic device accesses the first access point and the second access point simultaneously last time. After successfully establishing the second Wi-Fi connection, the first electronic device may exchange data with the first access point and the second access point. In this way, the first electronic device may quickly establish a Wi-Fi connection with the second access point through the association relationship between the first access point and the second access point while maintaining the first Wi-Fi connection with the first access point, and exchange data with the second access point through the Wi-Fi connection, to shorten a time spent on accessing the second access point, improve the efficiency of accessing the second access point, and improve the user experience.

According to the first aspect, the association relationship is established based on network information of the first access point and network information of the second access point, and the network information includes at least one of the following: basic service set identifier BSSID information, service set identifier SSID information, and channel information of a channel to which the first access point or second access point belongs. In this way, the first electronic device may search for, based on the network information of the first access point, an access point associated with the first access point, that is, the network information of the second access point, and may establish a second Wi-Fi connection relationship with the second access point based on the found network information of the second access point.

According to the first aspect or any one of the implementations of the first aspect, the establishing, by the first electronic device, a second Wi-Fi connection with a second access point includes: establishing, by the first electronic device, the second Wi-Fi connection with the second access point based on historical connection information of the second access point, where the historical connection information is saved after the second access point is accessed before the first electronic device exchanges data with the first access point and the second access point last time, and the historical connection information includes the network information of the second access point, or the historical connection information includes the network information of the second access point and a connection password of the second access point. In this way, after the first electronic device accessed the second access point once and stores the historical connection information of the second access point, the first electronic device can quickly establish the Wi-Fi connection with the second access point based on the stored historical connection information.

For example, the historical connection information may further include a connection account and an encryption method of the second access point.

According to the first aspect or any one of the implementations of the first aspect, the establishing, by the first electronic device, a second Wi-Fi connection with a second access point includes: sending, by the first electronic device, a probe message on a second channel to which the second access point belongs; receiving, by the first electronic device, a probe response message sent by the second access point on the second channel; and establishing, by the first electronic device, the second Wi-Fi connection with the second access point in response to the received probe response message. In this way, based on the association relationship between the first access point and the second access point, the first electronic device only performs detection on the channel to which the second access point belongs, thereby shortening the duration taken for a detection phase and effectively improving the efficiency of accessing the second access point.

According to the first aspect or any one of the implementations of the first aspect, that the first electronic device exchanges data with the first access point through the first Wi-Fi connection includes: obtaining, by the first electronic device, DHCP information from a DHCP server through the first Wi-Fi connection; The exchanging, by the first electronic device, data with the first access point and the second access point includes: exchanging, by the first electronic device, data with the second access point based on the DHCP information. In this way, after the first electronic device accesses the first access point, the first electronic device can communicate with the DHCP server through the first Wi-Fi connection, which may also be understood as through the first access point, to obtain the DHCP information from the DHCP server, and after accessing the second access point, the first electronic device accesses a network based on the obtained DHCP information, thereby effectively shortening the duration taken for the DHCP phase and further improving the efficiency of accessing the second access point.

According to the first aspect or any one of the implementations of the first aspect, the method further includes: establishing, by the first electronic device, a third Wi-Fi connection with a second electronic device in response to a received first operation, and performing a screen mirroring service with the second electronic device through the third Wi-Fi connection; and disconnecting, by the first electronic device, the second Wi-Fi connection. In this way, the first electronic device can disconnect the second Wi-Fi connection when performing the screen mirroring service, thereby ensuring the data transmission efficiency of the screen mirroring service.

According to the first aspect or any one of the implementations of the first aspect, the exchanging, by the first electronic device, data with the first access point and the second access point includes: running, by the first electronic device, a first application in response to a received second operation; performing, by the first electronic device, transmission of data of the first application over the second Wi-Fi connection, or over the first Wi-Fi connection and the second Wi-Fi connection. In this way, the first electronic device can perform data transmission concurrently, or perform data transmission by using a Wi-Fi with better communication quality, to effectively improve the throughput and stability.

According to the first aspect or any one of the implementations of the first aspect, the access condition includes at least one of the following: in a case that a third operation is received, the third operation is used for instructing to establish the second Wi-Fi connection while maintaining the first Wi-Fi connection; a communication quality parameter of the first Wi-Fi connection is lower than a threshold; and the first electronic device runs a specified application. In this way, the first electronic device can quickly access the second access point when the access condition is met, to effectively improve the throughput and stability.

According to the first aspect or any one of the implementations of the first aspect, the first Wi-Fi connection is established on a first channel in a first frequency band, and the second Wi-Fi connection is established on a second channel in a second frequency band, where the first frequency band is the same as or different from the second frequency band. In this way, the technical solutions in this application may be applied to a dual-band Wi-Fi application scenario, and may also be applied to an intra-band Wi-Fi application scenario.

According to the first aspect or any one of the implementations of the first aspect, the first frequency band is a 5 GHz frequency band, and the second frequency band is a 2.4 GHz frequency band. In this way, the first electronic device can establish Wi-Fi connections in the 5 GHz frequency band and the 2.4 GHz frequency band simultaneously, to improve the throughput and stability of data transmission.

According to the first aspect or any one of the implementations of the first aspect, the first access point and the second access point are a same device, and the device is a dual-band integrated router. In this way, the technical solutions in this embodiment of this application may be applied to an application scenario in which the first electronic device is connected to the dual-band integrated router.

According to the first aspect or any one of the implementations of the first aspect, the first access point and the second access point are different devices. In this way, the technical solutions in this embodiment of this application may be applied to an application scenario in which the first electronic device is connected to different routers.

According to the first aspect or any one of the implementations of the first aspect, the method further includes: displaying, by the first electronic device, a network icon, where the network icon is used for indicating that the first electronic device exchanges data with the first access point and the second access point. In this way, the first electronic device can display a specific network icon to indicate that two current Wi-Fi connections.

According to a second aspect, an embodiment of this application provides a dual Wi-Fi connection method. The method includes: exchanging, by a first electronic device, data with a first access point through a first Wi-Fi connection; sending, by the first electronic device, according to an association relationship between the first access point and a second access point in a case that an access condition is met, a probe message on a second channel to which the second access point belongs, where the association relationship is recorded when the first electronic device exchanges data with the first access point and the second access point last time; sending, by the first electronic device, the probe message on a channel of a second frequency band to which the second channel belongs in a case that a probe response message sent by the second access point is not received within a specified duration; establishing, by the first electronic device, a third Wi-Fi connection with the third access point in response to a received probe response message sent by a third access point on a third channel; and exchanging, by the first electronic device, data with the first access point and the third access point after the first electronic device establishes the third Wi-Fi connection with the third access point. In this way, when the first electronic device fails to find the second access point on a specified channel through scanning, the first electronic device may perform full frequency band scanning on the second frequency band, that is, scan all channels in the second frequency band. After the third access point is found through scanning, the third access point is accessed, so that the first electronic device can exchange data with the first access point and the third access point simultaneously, to improve the throughput and the reliability of data transmission.

For example, the first electronic device has accessed the third access point before, and stores historical connection information of the third access point.

For example, the second access point and the third access point may be a same device, or may be different devices.

For example, the second channel is the same as or different from the third channel.

According to the second aspect, the method further includes: recording, by the first electronic device, an association relationship between the first access point and the third access point. In this way, the first electronic device may establish the third Wi-Fi connection with the third access point based on the association relationship between the first access point and the third access point when the access condition is met a next time, and may exchange data with the first access point and the third access point simultaneously.

According to a third aspect, an embodiment of this application provides an electronic device. The electronic device includes a memory and a processor, where the memory is coupled to the processor. The memory stores program instructions, and when executed by the processor, the program instructions cause the electronic device to perform the following steps: exchanging data with a first access point through a first Wi-Fi connection; establishing a second Wi-Fi connection with a second access point according to an association relationship between the first access point and the second access point in a case that an access condition is met, where the association relationship is recorded when the first electronic device exchanges data with the first access point and the second access point last time; exchanging data with the first access point and the second access point after the first electronic device establishes the second Wi-Fi connection with the second access point.

According to the third aspect, the association relationship is established based on network information of the first access point and network information of the second access point, and the network information includes at least one of the following: basic service set identifier BSSID information, service set identifier SSID information, and channel information of a channel to which the first access point or second access point belongs.

According to the third aspect or any one of the implementations of the third aspect, when executed by the processor, the program instructions cause the electronic device to perform the following steps: establishing the second Wi-Fi connection with the second access point based on historical connection information of the second access point, where the historical connection information is saved after the second access point is accessed before the first electronic device exchanges data with the first access point and the second access point last time, and the historical connection information includes the network information of the second access point, or the historical connection information includes the network information of the second access point and a connection password of the second access point.

According to the third aspect or any one of the implementations of the third aspect, when executed by the processor, the program instructions cause the electronic device to perform the following steps: sending a probe message on a second channel to which the second access point belongs; receiving a probe response message sent by the second access point on the second channel; and establishing the second Wi-Fi connection with the second access point in response to the received probe response message.

According to the third aspect or any one of the implementations of the third aspect, when executed by the processor, the program instructions cause the electronic device to perform the following steps: obtaining DHCP information from a DHCP server through the first Wi-Fi connection when exchanging data with the first access point through the first Wi-Fi connection; and the exchanging data with the first access point and the second access point includes exchanging data with the second access point based on the DHCP information.

According to the third aspect or any one of the implementations of the third aspect, when executed by the processor, the program instructions cause the electronic device to perform the following steps: establishing a third Wi-Fi connection with a second electronic device in response to a received first operation, and performing a screen mirroring service with the second electronic device through the third Wi-Fi connection; and disconnecting the second Wi-Fi connection.

According to the third aspect or any one of the implementations of the third aspect, when executed by the processor, the program instructions cause the electronic device to perform the following steps: running a first application in response to a received second operation; and performing transmission of data of the first application over the second Wi-Fi connection, or over the first Wi-Fi connection and the second Wi-Fi connection.

According to the third aspect or any one of the implementations of the third aspect, the access condition includes at least one of the following: in a case that a third operation is received, the third operation is used for instructing to establish the second Wi-Fi connection while maintaining the first Wi-Fi connection; a communication quality parameter of the first Wi-Fi connection is lower than a threshold; and the first electronic device runs a specified application.

According to the third aspect or any one of the implementations of the third aspect, the first Wi-Fi connection is established on a first channel in a first frequency band, and the second Wi-Fi connection is established on a second channel in a second frequency band, where the first frequency band is the same as or different from the second frequency band.

According to the third aspect or any one of the implementations of the third aspect, the first frequency band is a 5 GHz frequency band, and the second frequency band is a 2.4 GHz frequency band.

According to the third aspect or any one of the implementations of the third aspect, the first access point and the second access point are a same device, and the device is a dual-band integrated router.

According to the third aspect or any one of the implementations of the third aspect, the first access point and the second access point are different devices.

According to the third aspect or any one of the implementations of the third aspect, when executed by the processor, the program instructions cause the electronic device to perform the following steps: displaying a network icon, where the network icon is used for indicating that the first electronic device exchanges data with the first access point and the second access point.

The third aspect and any one of the implementations of the third aspect correspond to the first aspect and any one of the implementations of the first aspect respectively. For the technical effects corresponding to the third aspect and any one of the implementations of the third aspect, refer to the technical effects corresponding to the foregoing first aspect and any one of the implementations of the first aspect. Details are not described herein again.

According to a fourth aspect, an embodiment of this application provides an electronic device. The electronic device includes a memory and a processor, where the memory is coupled to the processor. The memory stores program instructions, and when executed by the processor, the program instructions cause the electronic device to perform the following steps: exchanging data with a first access point through a first Wi-Fi connection; sending, according to an association relationship between the first access point and a second access point in a case that an access condition is met, a probe message on a second channel to which the second access point belongs, where the association relationship is recorded when the first electronic device exchanges data with the first access point and the second access point last time; sending the probe message on a channel of a second frequency band to which the second channel belongs in a case that a probe response message sent by the second access point is not received within a specified duration; establishing, by the first electronic device, a third Wi-Fi connection with the third access point in response to a received probe response message sent by a third access point on a third channel; and exchanging data with the first access point and the third access point after the first electronic device establishes the third Wi-Fi connection with the third access point.

According to the fourth aspect, when executed by the processor, the program instructions cause the electronic device to perform the following steps: recording an association relationship between the first access point and third access point;

The fourth aspect and any one of the implementations of the fourth aspect correspond to the second aspect and any one of the implementations of the second aspect respectively. For the technical effects corresponding to the fourth aspect and any one of the implementations of the fourth aspect, refer to the technical effects corresponding to the foregoing second aspect and any one of the implementations of the second aspect. Details are not described herein again.

In a fifth aspect, an embodiment of this application provides a chip. The chip includes one or more interface circuits and one or more processors, where the interface circuits are configured to receive signals from a memory of an electronic device and send the signals to the processor, the signals include computer instructions stored in the memory, and when executing the computer instructions, the processor causes the electronic device to perform the dual Wi-Fi connection method according to the first aspect and any one of the implementations of the first aspect.

The fifth aspect and any one of the implementations of the fifth aspect correspond to the first aspect and any one of the implementations of the first aspect respectively. For the technical effects corresponding to the fifth aspect and any one of the implementations of the fifth aspect, refer to the technical effects corresponding to the foregoing first aspect and any one of the implementations of the first aspect. Details are not described herein again.

In a sixth aspect, an embodiment of this application provides a chip. The chip includes one or more interface circuits and one or more processors, where the interface circuits are configured to receive signals from a memory of an electronic device and send the signals to the processor, the signals include computer instructions stored in the memory, and when executing the computer instructions, the processor causes the electronic device to perform the dual Wi-Fi connection method according to the second aspect and any one of the implementations of the second aspect.

The sixth aspect and any one of the implementations of the sixth aspect correspond to the second aspect and any one of the implementations of the second aspect respectively. For the technical effects corresponding to the sixth aspect and any one of the implementations of the sixth aspect, refer to the technical effects corresponding to the foregoing second aspect and any one of the implementations of the second aspect. Details are not described herein again.

According to a seventh aspect, an embodiment of this application provides a computer-readable storage medium. The computer-readable storage medium includes a computer program. When run on an electronic device, the computer program causes the electronic device to perform the dual Wi-Fi connection method according to the first aspect and any one of the implementations of the first aspect.

The seventh aspect and any one of the implementations of the seventh aspect correspond to the first aspect and any one of the implementations of the first aspect respectively. For the technical effects corresponding to the seventh aspect and any one of the implementations of the seventh aspect, refer to the technical effects corresponding to the foregoing first aspect and any one of the implementations of the first aspect. Details are not described herein again.

According to an eighth aspect, an embodiment of this application provides a computer-readable storage medium. The computer-readable storage medium includes a computer program. When run on an electronic device, the computer program causes the electronic device to perform the dual Wi-Fi connection method according to the second aspect and any one of the implementations of the second aspect.

The eighth aspect and any one of the implementations of the eighth aspect correspond to the second aspect and any one of the implementations of the second aspect respectively. For the technical effects corresponding to the eighth aspect and any one of the implementations of the eighth aspect, refer to the technical effects corresponding to the foregoing second aspect and any one of the implementations of the second aspect. Details are not described herein again.

DESCRIPTION OF EMBODIMENTS

The following clearly and completely describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts shall fall within the protection scope of this application.

The term "and/or" used herein describes only an association relationship for describing associated objects and represents that three relationships may exist. For example, A and/or B may represent the following three cases: Only A exists, both A and B exist, and only B exists.

In the specification and claims in the embodiments of this application, the terms "first", "second", and the like are intended to distinguish between different objects but do not indicate a particular order of the objects. For example, a first target object, a second target object, and the like are intended to distinguish between different target objects but do not indicate a particular order of the target objects.

In the embodiments of this application, the word "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "exemplary" or "for example" or the like is intended to present a related concept in a specific manner.

In the description of the embodiments of this application, unless otherwise stated, "a plurality of" refers to two or more. For example, a plurality of processing units refer to two or more processing units; and a plurality of systems refer to two or more systems.

Figure 1:
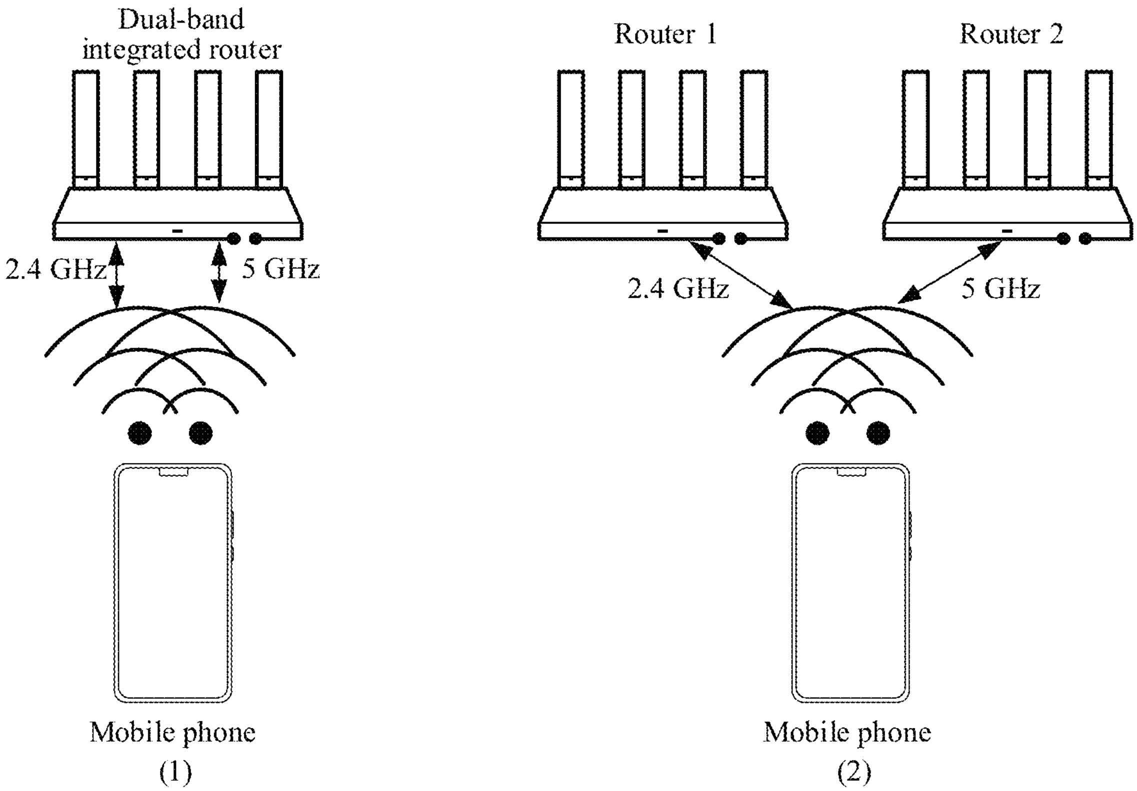
FIG. 1 illustrates a schematic diagram of a communication system.

Before the technical solutions of the embodiments of this application are described, a communication system of the embodiments of this application is first described with reference to the accompanying drawings. FIG. 1 is a schematic diagram of a communication system according to an embodiment of this application. Referring to FIG. 1(1), for example, the communication system includes a mobile phone and a dual-band integrated router. The mobile phone may access the dual-band integrated router through a 2.4 GHz Wi-Fi connection (hereinafter referred to as 2.4 GHz connection) and a 5 GHz Wi-Fi connection (hereinafter referred to as 5 GHz connection), and exchange data with the dual-band integrated router through the 2.4 GHz connection and/or the 5 GHz connection. It should be noted that, the dual-band integrated router may be understood as a device with two access points. For example, each access point of the dual-band integrated router corresponds to one piece of access point identifier information, and the identifier information may be a BSSID (Basic Service Set Identifier, basic service set identifier). That is, after the mobile phone establishes a dual Wi-Fi connection with the dual-band integrated router, the mobile phone may be considered as accessing the two access points. Referring to FIG. 1(2), for example, for the mobile phone, a router 1, and a router 2 in the communication system, the mobile phone may access the router 1 through the 2.4 GHz connection and access the router 2 through the 5 GHz connection, the mobile phone may exchange data with the router 1 through the 2.4 GHz connection, and the mobile phone may exchange data with the router 2 through the 5 GHz connection. The communication system shown in FIG. 1 may be referred to as a dual-band Wi-Fi system, that is, a mobile phone with a dual-band Wi-Fi function may establish two inter-band Wi-Fi connections (for example, a 2.4 GHz connection and a 5 GHz connection) with a same router (for example, a dual-band integrated router) or with different routers, so as to send and receive data through the two inter-band Wi-Fi connections, thereby improving network throughput of the mobile phone and reducing the data transmission latency.

It should be noted that, this embodiment of this application is described by using only the dual-band connection between the mobile phone and the router as an example. In other embodiments, the mobile phone in FIG. 1 may also be any other terminal product (or referred to as a terminal device or an electronic device) that supports 802.11 series standards, for example, a tablet computer, a notebook computer, a vehicle-mounted device, or a wearable device. For example, the terminal may also be referred to as a station (Station, STA) in a basic service set (Basic Service Set, BSS). The so-called station refers to a terminal device (electronic device) that has a Wi-Fi communication function and is connected to a wireless network. The station may support various wireless local area network (wireless local area networks, WLAN) modes of an 802.11 family, such as 802.11be, 802.11ax, 802.11ac, 802.11n, 802.11g, 802.11b, and 802.11.

Optionally, the router in FIG. 1 may also be a terminal device (such as a mobile phone) with a Wi-Fi chip or another network device, and the router may be referred to as an access point (Access Point, AP) in the BSS. For example, the access point may be a device that supports the 802.11be mode. The access points may also be a device that supports various WLAN modes of the 802.11 family, such as 802.11be, 802.11ax, 802.11ac, 802.11n, 802.11g, 802.11b, and 802.11a. For example, as described above, the dual-band integrated router may be regarded as a router with two access points.

During the evolution from 802.11a via 802.11g, 802.11n, and 802.11ac to 802.11ax, available frequency bands include 2.4 gigahertz (GHz) and 5 GHz. As an increasing quantity of frequency bands are opened, a maximum channel bandwidth supported by 802.11 is expanded from 20 megahertz (MHz) to 40 MHz and further to 160 MHz. In 2017, Federal Communications Commission (federal communications commission, FCC) opened a new free frequency band 6 GHz (5925 MHz to 7125 MHz). 802.11ax standards workers expanded an operating range of 802.11ax devices from 2.4 GHz and 5 GHz to 2.4 GHz, 5 GHz, and 6 GHz in the 802.11ax project authorization request (project authorization request, PAR). In this application, descriptions are provided by using only an example in which electronic devices (such as mobile phones and routers) work at 2.5 GHz and 5 GHz. This embodiment of this application is also applicable to a scenario of data transmission between electronic devices that support a next-generation communication protocol (for example, 802.11be).

Figure 2:
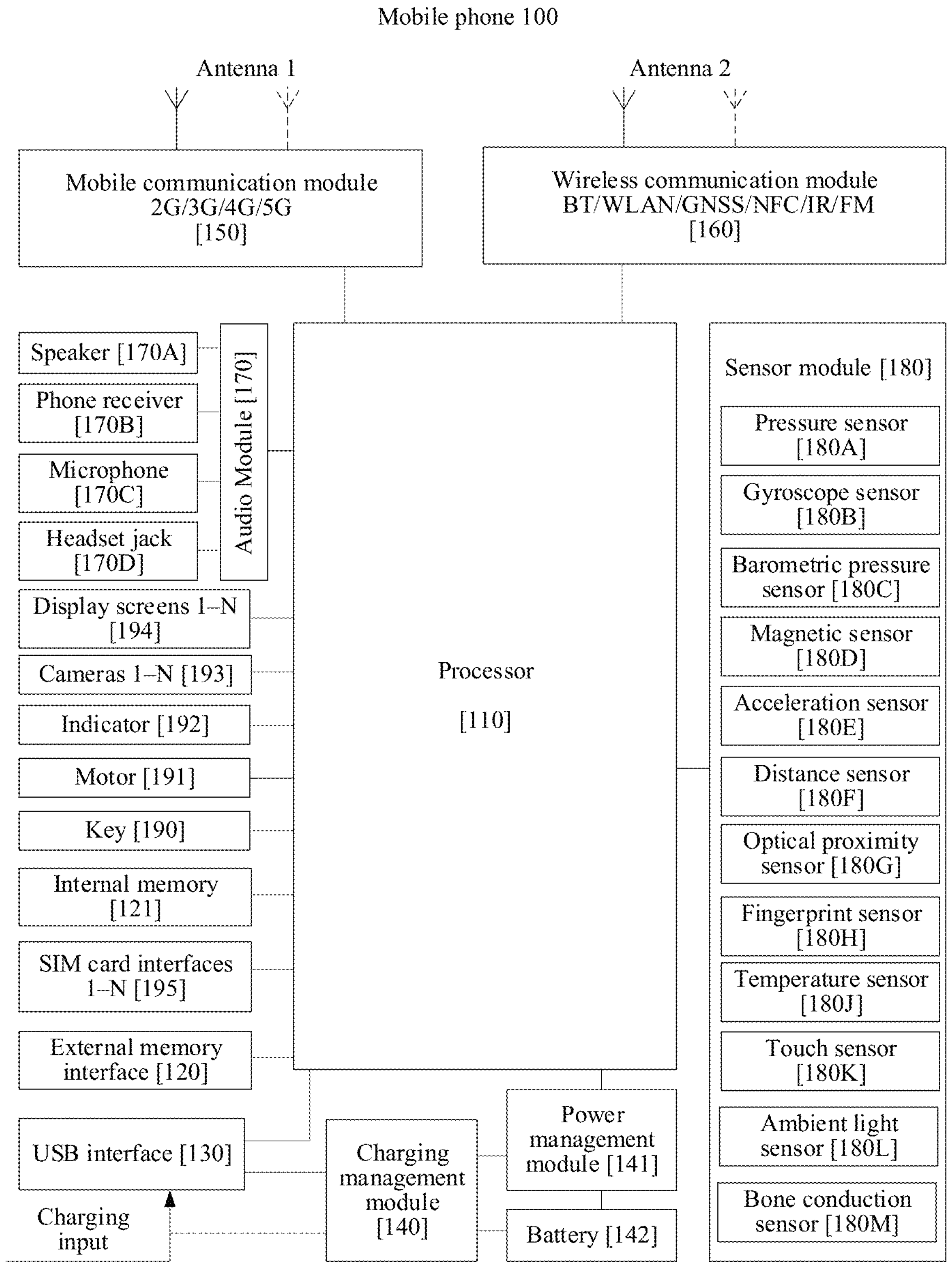
FIG. 2 illustrates a schematic structural diagram of a mobile phone.

FIG. 2 is a schematic structural diagram of a mobile phone according to an embodiment of this application. It should be understood that, a mobile phone 100 shown in FIG. 2 is only an example of the terminal device in this embodiment of this application. The mobile phone 100 may include more or fewer components than those shown in the figure, or combine two or more components, or have a different component configuration. Various components shown in FIG. 2 may be implemented by hardware that includes one or more signal processors and/or application-specific integrated circuits, software, or a combination of hardware and software.

Referring to FIG. 2, the mobile phone 100 may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the mobile phone 100. The controller may generate an operating control signal according to an instruction operation code and a timing signal, to complete control of fetching and executing an instruction.

A memory may be further configured in the processor 110, to store instructions and data. In some embodiments, the memory in the processor 110 is a cache. The memory may store an instruction or data that has just been used or cyclically used by the processor 110. If the processor 110 needs to use the instruction or the data again, the processor may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface.

The I2C interface is a bidirectional synchronous serial bus, and includes a serial data line (serial data line, SDA) and a serial clock line (derail clock line, SCL). In some embodiments, the processor 110 may include a plurality of groups of I2C buses. The processor 110 may be coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communication module 160 through the I2S interface, to implement a function of answering a call through a Bluetooth headset.

The USB interface 130 is an interface that conforms to a USB standard specification, and may be specifically a mini USB interface, a micro USB interface, a USB Type C interface, or the like. The USB interface 130 may be configured to connect to the charger to charge the mobile phone 100, or may be used for data transmission between the mobile phone 100 and a peripheral, or may be configured to connect to a headset, to play audio through the headset. The interface may also be configured to connect to another mobile phone such as an AR device.

It may be understood that a schematic interface connection relationship between the modules in this embodiment of this application is merely an example for description, and constitutes no limitation on the structure of the mobile phone 100. In some other embodiments of this application, the mobile phone 100 may also use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the mobile phone 100. The charging management module 140 may supply power to the mobile phone through the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display screen 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may also be disposed in the processor 110. In some other embodiments, the power management module 141 and the charging management module 140 may also be configured in the same device.

A wireless communication function of the mobile phone 100 may be implemented through the antenna 1, the antenna 2, the mobile communication module 150, the wireless communication module 160, the modem processor, the baseband processor, and the like.

The antenna 1 and the antenna 2 are configured to transmit or receive an electromagnetic wave signal. Each antenna in the mobile phone 100 may be configured to cover one or more communication frequency bands. Different antennas may also be multiplexed to improve utilization of the antennas. For example, the antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the mobile phone 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing, such as filtering and amplification, on the received electromagnetic wave, and transmit the processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in the same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Next, the demodulator transmits the demodulated low-frequency baseband signal to the baseband processor for processing. The low-frequency baseband signal is processed by the baseband processor and then transferred to an application processor. The application processor outputs a sound signal through an audio device (which is not limited to the speaker 170A, the phone receiver 170B, and the like), or displays an image or a video through the display screen 194. In some embodiments, the modem processor may be an independent device. In some other embodiments, the modem processor may be independent of the processor 110, and the modem processor and the mobile communication module 150 or another functional module may be disposed in the same component.

The wireless communication module 160 may provide solutions for wireless communication, including a wireless local area network (wireless local area networks, WLAN) (such as a Wi-Fi network), Bluetooth (Bluetooth, BT), and a global navigation satellite system (global navigation satellite system, GNSS), frequency modulation (frequency modulation, FM), a near field communication (near field communication, NFC) technology, an infrared (infrared, IR) technology, and the like, applicable to the mobile phone 100. The wireless communication module 160 may be one or more components into which at least one communication processing module is integrated. The wireless communication module 160 receives an electromagnetic wave through the antenna 2, performs frequency modulation and filtering processing on an electromagnetic wave signal, and sends a processed signal to the processor 110. The wireless communication module 160 may also receive a to-be-sent signal from the processor 110, perform frequency modulation and amplification on the to-be-transmitted signal, and convert the signal into an electromagnetic wave for radiation through the antenna 2.

In some embodiments, in the mobile phone 100, the antenna 1 is coupled to the mobile communication module 150, and the antenna 2 is coupled to the wireless communication module 160, so that the mobile phone 100 may communicate with a network and another device through a wireless communication technology. The wireless communication technology may include a Global System for Mobile Communications (global system for mobile communications, GSM), a General Packet Radio Service (General Packet Radio Service, GPRS), Code Division Multiple Access (Code Division Multiple Access, CDMA), Wideband Code Division Multiple Access (Wideband Code Division Multiple Access, WCDMA), Time-Division Code Division Multiple Access (Time-Division Code Division Multiple Access, TD-SCDMA), Long Term Evolution (Long Term Evolution, LTE), BT, a GNSS, a WLAN, NFC, FM, an IR technology, and/or the like. The GNSS may include a global positioning system (global positioning system, GPS), a Global Navigation Satellite System (Global Navigation Satellite System, GLONASS), and a BeiDou Navigation Satellite System (BeiDou Navigation Satellite System, BDS), a Quasi-Zenith Satellite System (Quasi-Zenith Satellite System, QZSS), and/or a Satellite Based Augmentation System (Satellite Based Augmentation System, SBAS).

Figure 3:
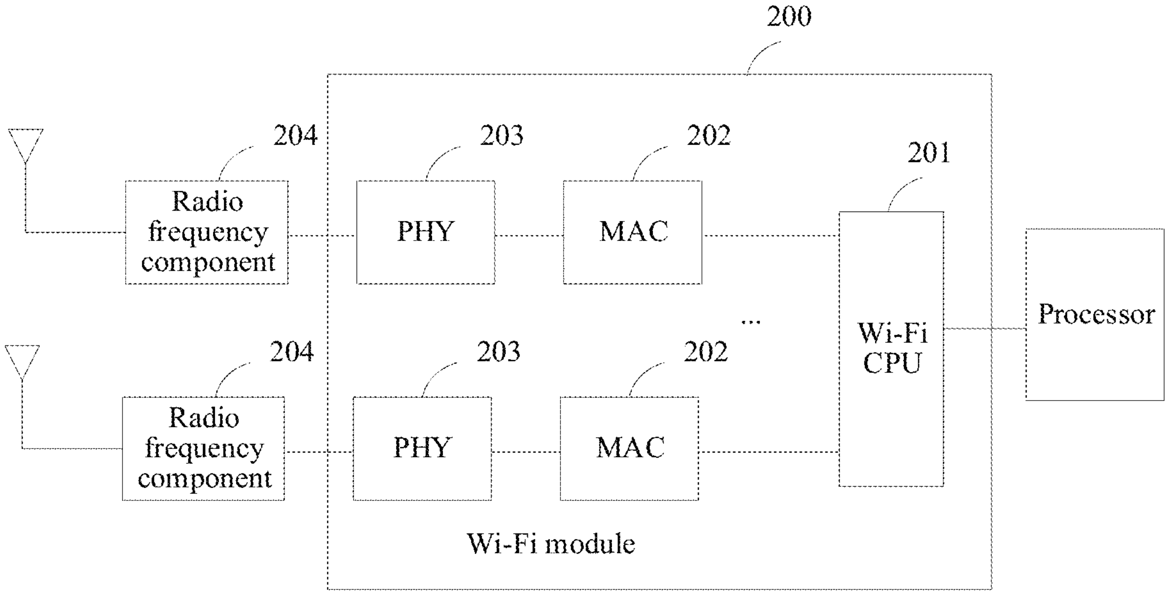
FIG. 3 illustrates a schematic structural diagram of a Wi-Fi module.

FIG. 3 illustrates a schematic structural diagram of a Wi-Fi module in a wireless communication module 160. For example, a Wi-Fi CPU (that is, a Wi-Fi processor) 201 is loaded in a Wi-Fi module 200. The Wi-Fi CPU 201 is optionally a kernel processor of the Wi-Fi module, and is configured to process a Wi-Fi-related computing function, for example, is responsible for congestion control, carrier aggregation, frame filtering, key control, management frame transmission and reception, and the like. It may be understood that the processor and the Wi-Fi module 200 may be integrated on the same chip, or may be integrated on different chips and be connected through a bus, which is not limited in this application.

Referring to FIG. 3 again, for example, N Wi-Fi radio frequency circuits are integrated in the Wi-Fi module 200, where N is a natural number greater than or equal to 2. Each Wi-Fi radio frequency circuit in the N Wi-Fi radio frequency circuits is configured to access a corresponding Wi-Fi network, and each Wi-Fi radio frequency circuit corresponds to a set of independent Media Access Control (Media Access Control, MAC) 202 and a physical layer (physical layer, PHY) 203. N sets of MAC 202 and the PHY 203 share the Wi-Fi CPU 201, so that simultaneous data transmission and reception is implemented, thereby realizing Dual-Band Dual-Concurrent (Dual-Band Dual-Concurrent, DBDC). For example, if N is 2, that is, the Wi-Fi module 200 includes two Wi-Fi radio frequency circuits. Optionally, one Wi-Fi radio frequency circuit may be configured to access a 2.4 GHz network, for example, the router 1 in FIG. 1, and the other Wi-Fi radio frequency circuit may be configured to access a 5 GHz network, for example, the router 2 in FIG. 1.

Still referring to FIG. 3, functions of the MAC 202 mainly include channel access, framing and deframing, data transmission and reception, encryption and decryption, and energy saving control. Certainly, the MAC 202 may also be implemented through the Wi-Fi CPU 201, that is, the functions of the MAC 202 are implemented through the Wi-Fi CPU 201. The PHY 203 mainly implements physical layer functions such as digital baseband processing.

Optionally, the Wi-Fi module 200 is coupled to a radio frequency component 204. The radio frequency component 204 is configured to convert a baseband signal that is processed by the MAC 202 and the PHY 203 into a radio frequency signal and transmit the radio frequency signal, and convert the radio frequency signal received from an antenna into a baseband signal for further processing by the PHY 203 and the MAC 202. Optionally, there may be one radio frequency component 204, that is, N radio frequency circuits share the radio frequency component 204, or there may be N radio frequency components 204, that is, each radio frequency circuit in the N radio frequency circuits corresponds to one radio frequency component 204, which is not limited in this application. Optionally, the radio frequency component 204 may be integrated on a Wi-Fi chip in which the Wi-Fi module is located, or may be integrated outside the chip, which is not limited in this application.

It may be understood that the Wi-Fi CPU 201 may also be replaced by a DSP (digital signal processor) or an independent FPGA (field programmable gate array) chip. The specific form of the processor that implements Wi-Fi processing may be flexible and variable. The quantity and layout of devices in FIG. 3 are for reference only and are not intended to impose limitations.

With reference to FIG. 3, a mobile phone with a dual-band connection function, or in other words, with a dual Wi-Fi function, described in this embodiment of this application is optionally a mobile phone with two Wi-Fi radio frequency circuits. The mobile phone involved in this embodiment of this application accesses two routers simultaneously, or the mobile phone accesses two access points in a router simultaneously. Optionally, the mobile phone keeps connections with the two access points (which may be the same device or different devices) simultaneously, and may perform data transmission on the two connections, or on one of the two connections. The mobile phone involved in this embodiment of this application accesses two access points simultaneously, which may also be understood as that a dual-band integrated router can obtain two MAC addresses of the mobile phone. That is, the mobile phone that establishes a dual Wi-Fi connection with the dual-band integrated router is equivalent to having two STAs, where each STA corresponds to one MAC address. The dual-band integrated router that establishes the dual Wi-Fi connection with the mobile phone is equivalent to having two access points, where each access point corresponds to one BSSID.

Referring to FIG. 2 again, the mobile phone 100 implements a display function through the GPU, the display screen 194, the application processor, and the like. The GPU is a microprocessor for image processing, and is connected to the display screen 194 and the application processor. The GPU is configured to perform mathematical and geometric calculation for graphics rendering. The processor 110 may include one or more GPUs, and execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro-OLED, a quantum dot light-emitting diode (quantum dot light-emitting diode, QLED), or the like. In some embodiments, the mobile phone 100 may include one or N display screens 194, where N is a positive integer greater than 1.

The mobile phone 100 may implement a photographing function through the ISP, the camera 193, the video codec, the GPU, the display screen 194, the application processor, and the like.

The ISP is configured to process data fed back by the camera 193. For example, during photographing, a shutter is opened. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may further perform algorithm optimization on noise, luminance, and complexion of the image. The ISP may further optimize parameters such as exposure and a color temperature of a shooting scene. In some embodiments, the ISP may be disposed in the camera 193.

The camera 193 is configured to capture a static image or a video. An optical image of an object is generated through a lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP to convert the electrical signal into a digital image signal. The ISP outputs the digital image signal to the DSP for processing. The DSP converts the digital image signal into a standard image signal in RGB and YUV formats. In some embodiments, the mobile phone 100 may include one or N cameras 193, where N is a positive integer greater than 1.

The digital signal processor is configured to process a digital signal, and may further process another digital signal in addition to a digital image signal. For example, when the mobile phone 100 performs frequency selection, the digital signal processor is configured to perform Fourier transform and the like on frequency energy.

The video codec is configured to compress or decompress a digital video. The mobile phone 100 may support one or more video codecs. In this way, the mobile phone 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor quickly processes input information by referring to a structure of a biological neural network, for example, a transmission mode between neurons in a human brain, and may further continuously perform self-learning. The NPU may be used to implement an application such as intelligent cognition of the mobile phone 100, for example, image recognition, facial recognition, voice recognition, and text understanding.

The external memory interface 120 may be configured to connect to an external storage card, for example, a micro SD card, to expand a storage capability of the mobile phone 100. The external storage card communicates with the processor 110 through the external memory interface 120, to implement a data storage function, for example, storing a file such as a music or a video in the external storage card.

The internal memory 121 may be configured to store computer executable program code, and the executable program code includes instructions. The processor 110 runs the instruction stored in the internal memory 121, to perform various function applications and data processing of the mobile phone 100. The internal memory 121 may include a program storage region and a data storage region. The program storage region may store an operating system, an application program required by at least one function (for example, a voice playing function or an image playing function), and the like. The data storage region may store data (for example, audio data and an address book) and the like created when the mobile phone 100 is used. In addition, the internal memory 121 may include a high-speed random access memory, or may include a non-volatile memory such as at least one magnetic disk memory, a flash memory, or a universal flash storage (universal flash storage, UFS).

The mobile phone 100 may implement an audio function through the audio module 170, the speaker 170A, the phone receiver 170B, the microphone 170C, the headset jack 170D, the application processor, and the like, such as music playback, recording, and the like.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "horn", is configured to convert an audio electrical signal into a sound signal. Music can be listened to or a hands-free call can be answered through the speaker 170A in the mobile phone 100.

The phone receiver 170B, also referred to as a "receiver", is configured to convert an audio electrical signal into a sound signal. When the mobile phone 100 is configured to answer a call or receive voice information, the phone receiver 170B may be put close to a human ear to receive a voice.

The microphone 170C, also referred to as a "microphone" or a "megaphone", is configured to convert a sound signal into an electrical signal. When making a call or sending voice information, a user may make a sound near the microphone 170C through the mouth of the user, to input a sound signal into the microphone 170C. At least one microphone 170C may be disposed in the mobile phone 100. In some other embodiments, two microphones 170C may be disposed in the mobile phone 100, to collect a sound signal and implement a noise reduction function. In some other embodiments, three, four, or more microphones 170C may be alternatively disposed in the mobile phone 100, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile phone platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may include at least two parallel plates having conductive materials. When force is exerted on the pressure sensor 180A, capacitance between electrodes changes. The mobile phone 100 determines strength of pressure according to a capacitance change. When a touch operation is performed on the display screen 194, the mobile phone 100 detects strength of the touch operation through the pressure sensor 180A. The mobile phone 100 may further calculate a position of the touch according to a detection signal of the pressure sensor 180A. In some embodiments, touch operations that are performed on a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor 180B may be configured to determine a motion posture of the mobile phone 100. In some embodiments, an angular velocity of the mobile phone 100 around three axes that is, x, y, and z axes) may be determined through the gyroscope sensor 180B. The gyroscope sensor 180B may be used for image stabilization during photographing. For example, when the shutter is pressed, the gyro sensor 180B detects an angle at which the mobile phone 100 jitters, and calculates, based on the angle, a distance for which a lens module needs to compensate, and allows the lens to cancel the jitter of the mobile phone 100 through reverse motion, thereby implementing image stabilization. The gyro sensor 180B may also be used in navigation and a motion sensing game scenario.

The barometric pressure sensor 180C is configured to measure barometric pressure. In some embodiments, the mobile phone 100 calculates an altitude through a barometric pressure value measured by the barometric pressure sensor 180C, to assist in positioning and navigation.

The magnetic sensor 180D may include a Hall effect sensor. The mobile phone 100 may detect opening and closing of a flip holster through the magnetic sensor 180D. In some embodiments, when the mobile phone 100 is a flip machine, the mobile phone 100 may detect opening and closing of a flip cover through the magnetic sensor 180D, and further set features such as automatic unlocking of the flip cover according to the detected opening and closing state of the holster or opening and closing state of the flip cover.

The acceleration sensor 180E may detect acceleration values of the mobile phone 100 in all directions (generally in three axes). When the mobile phone 100 is stationary, a magnitude and a direction of gravity may be detected. The acceleration sensor may be further configured to recognize a posture of the mobile phone, and is applied to an application such as switching between landscape orientation and portrait orientation or a pedometer.

The distance sensor 180F is configured to measure a distance. The mobile phone 100 may measure a distance through infrared or laser. In some embodiments, in a photographing scenario, the mobile phone 100 may measure a distance through the distance sensor 180F, to implement quick focusing.

The optical proximity sensor 180G may include, for example, a light-emitting diode (LED) and an optical detector such as a photodiode. The light-emitting diode may be an infrared light-emitting diode. The mobile phone 100 may emit infrared light through the light-emitting diode. The mobile phone 100 detects infrared reflected light from a nearby object through the photodiode. When detecting sufficient reflected light, the mobile phone 100 may determine that there is an object near the mobile phone 100. When detecting insufficient reflected light, the mobile phone 100 may determine that there is no object near the mobile phone 100. The mobile phone 100 may detect, through the optical proximity sensor 180G, that a user holds the mobile phone 100 close to an ear for a call, so that automatic screen-off is implemented to achieve power saving. The optical proximity sensor 180G may be further configured to automatically unlock and lock the screen in a leather cover mode and a pocket mode.

The ambient light sensor 180L is configured to sense luminance of ambient light. The mobile phone 100 may adaptively adjust a luminance of the display screen 194 according to perceived brightness of the ambient light. The ambient light sensor 180L may be further configured to automatically adjust white balance during photo taking. The ambient light sensor 180L may further cooperate with the optical proximity sensor 180G to detect whether the mobile phone 100 is in a pocket, so as to prevent an accidental touch.

The fingerprint sensor 180H is configured to collect a fingerprint. The mobile phone 100 may implement fingerprint unlock, application lock accessing, fingerprint photographing, fingerprint-based call answering, and the like through a feature of the collected fingerprint.

The temperature sensor 180J is configured to detect a temperature. In some embodiments, the mobile phone 100 executes a temperature processing policy through a temperature detected by the temperature sensor 180J. For example, when the temperature reported by the temperature sensor 180J exceeds a threshold, the mobile phone 100 reduces performance of a processor near the temperature sensor 180J, to reduce power consumption and implement heat protection. In some other embodiments, when the temperature is lower than another threshold, the mobile phone 100 heats the battery 142, to avoid an abnormal shutdown of the mobile phone 100 caused by a low temperature. In some other embodiments, when the temperature is lower than still another threshold, the mobile phone 100 boosts an output voltage of the battery 142, to avoid an abnormal shutdown caused by a low temperature.

The touch sensor 180K is also referred to as a "touch panel". The touch sensor 180K may be disposed on the display screen 194. The touch sensor 180K and the display screen 194 form a touchscreen, which is also referred to as a "touchscreen". The touch sensor 180K is configured to detect a touch operation performed on or near the touch sensor 180K. The touch sensor may transmit the detected touch operation to the application processor, to determine a touch event type. The touch sensor 180K may provide a visual output related to the touch operation through the display screen 194. In some other embodiments, the touch sensor 180K may be alternatively disposed on a surface of the mobile phone 100, and is located on a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may alternatively contact a human pulse, and receive a blood pressure beating signal. In some embodiments, the bone conduction sensor 180M may be alternatively disposed in a headset, to form a bone conduction headset. The audio module 170 may parse out a voice signal based on the vibration signal of the vibration bone of the vocal-cord part that is obtained by the bone conduction sensor 180M, to implement a voice function. The application processor may parse heart rate information based on the blood pressure pulse signal obtained by the bone conduction sensor 180M, to implement a heart rate detection function.

The key 190 includes a power key, a volume key, and the like. The key 190 may be a mechanical key, or a touch-type key. The mobile phone 100 may receive a key input, and generate a key signal input related to user setting and function control of the mobile phone 100.

The motor 191 may generate a vibration prompt. The motor 191 may be configured to provide a vibration prompt for an incoming call, and may be further configured to provide a touch vibration feedback. For example, touch operations performed on different applications (for example, photo taking and audio playing) may correspond to different vibration feedback effects. For touch operations performed on different regions of the display screen 194, the motor 191 may also correspond to different vibration feedback effects. Different application scenarios (for example, a time prompt, information receiving, an alarm clock, and a game) may also correspond to different vibration feedback effects. A touch vibration feedback effect may be further customized.

The indicator 192 may be an indicator light, and may be configured to indicate a charging state or a battery change, or may be further configured to indicate a message, a missed call, a notification, or the like.

The SIM card interface 195 is configured to connect to a SIM card. The SIM card may be inserted into the SIM card interface 195 or plugged from the SIM card interface 195, to come into contact with or be separated from the mobile phone 100. The mobile phone 100 may support one or N SIM card interfaces, and N is a positive integer greater than 1. The SIM card interface 195 can support a nano SIM card, a micro SIM card, a SIM card, and the like. A plurality of cards may all be inserted into the same SIM card interface 195. The plurality of cards may be of the same type or different types. The SIM card interface 195 may further be compatible with different types of SIM cards. The SIM card interface 195 may also be compatible with an external memory card. The mobile phone 100 interacts with a network through the SIM card, to implement functions such as a call and data communication. In some embodiments, the mobile phone 100 uses an eSIM, that is, an embedded SIM card. The eSIM card may be embedded in the mobile phone 100 and cannot be separated from the mobile phone 100.

A software system of the mobile phone 100 may use a layered architecture, an event-driven architecture, a microkernel architecture, a micro service architecture, or a cloud architecture. In this embodiment of this application, the software structure of the mobile phone 100 is exemplarily described through an Android system with a layered architecture as an example.

Figure 4:
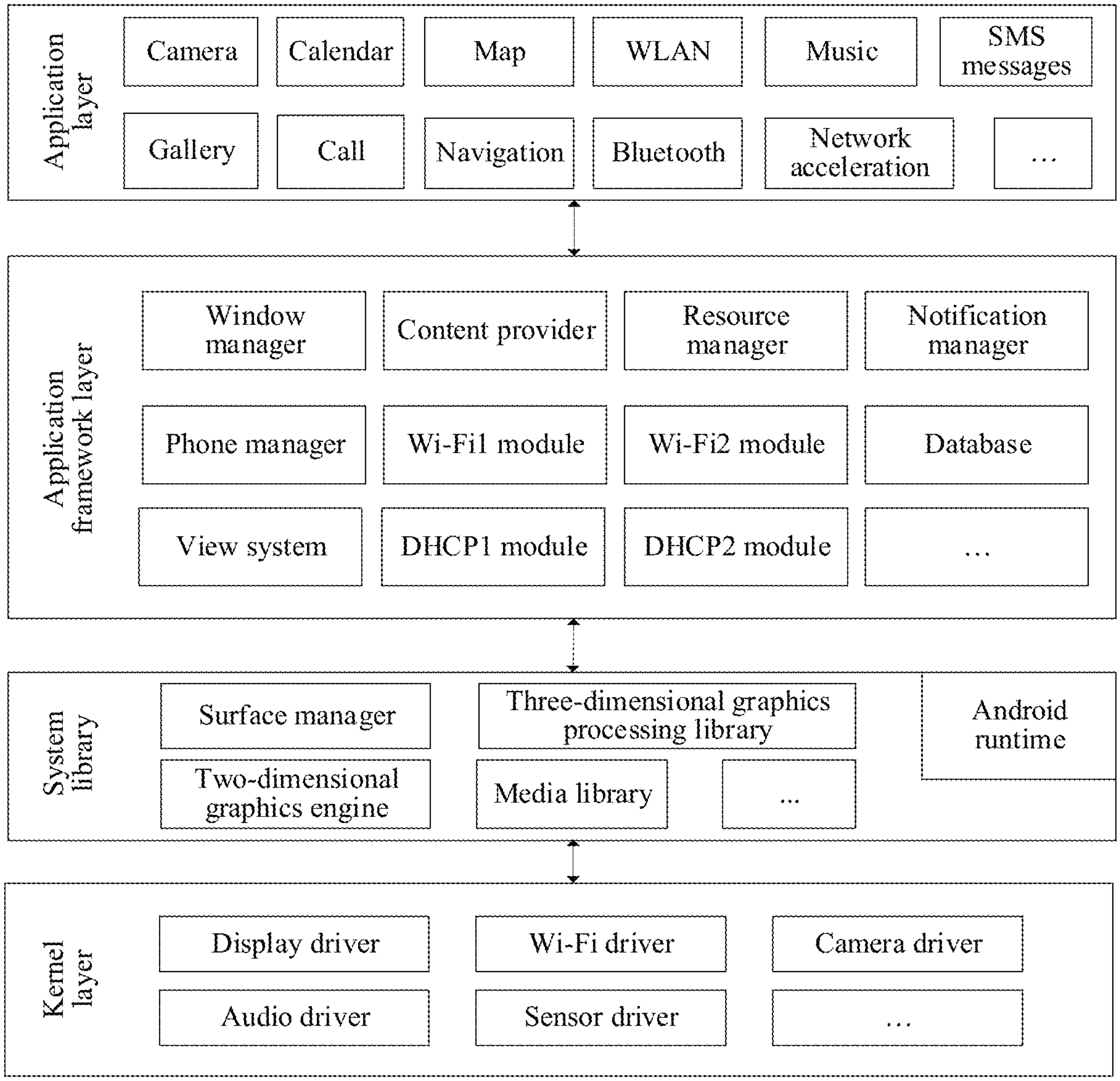
FIG. 4 illustrates a schematic diagram of a software structure of a mobile phone.

FIG. 4 is a block diagram of a software structure of a mobile phone 100 according to an embodiment of this application.

In a layered architecture of the mobile phone 100, software is divided into several layers, and each layer has a clear role and task. Layers communicate with each other through a software interface. In some embodiments, the Android system is divided into four layers that are respectively an application layer, an application framework layer, an Android runtime (Android runtime) and system library, and a kernel layer from top to bottom.

The application layer may include applications such as Camera, Gallery, Calendar, WLAN, Music, Video, Map, Bluetooth, Network acceleration, and the like. It should be noted that, the applications included in the application layer shown in FIG. 4 are only for illustration, which are not limited in this application. It may be understood that the applications included in the application layer do not constitute a specific limitation on the mobile phone 100. In some other embodiments of this application, compared with the applications included in the application layer shown in FIG. 4, the mobile phone 100 may include more or fewer applications, or the mobile phone 100 may include completely different applications.

The application framework layer provides an application programming interface (Application Programming Interface, API) and a programming framework for the applications in the application layer, including various components and services to support Android development of developers. The application framework layer includes some predefined functions.

As shown in FIG. 4, the application framework layer may include a window manager, a content provider, a view system, a phone manager, a resource manager, a notification manager, a Wi-Fi1 module, a Wi-Fi2 module, a DHCP (Dynamic Host Configuration Protocol, Dynamic Host Configuration Protocol) 1 module, a DHCP2 module, a database, and the like.

The window manager is configured to manage a window application. The window manager may obtain a size of a display screen, determine whether there is a status bar, lock the screen, capture the screen, and the like.

The content provider is configured to store and obtain data, so that the data can be accessed by an application. The data may include a video, an image, an audio, calls made and answered, a browsing history and bookmarks, an address book, and the like.

The view system includes a visual control such as a control for text display or a control for picture display. The view system may be configured to construct an application. A display interface may be formed by one or more views. For example, a display interface including an SMS notification icon may include a view for displaying text and a view for displaying a picture.

The phone manager is configured to provide a communication function of the electronic device 100, for example, call state management (including getting through, hang-up, and the like).

The resource manager provides various resources for an application, for example, a localized character string, an icon, a picture, a layout file, and a video file.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in a form of a graph or a scroll bar text, for example, a notification of an application running on the background, or may be a notification that appears on the screen in a form of a dialog window. For example, text information is prompted on a status bar, a prompt tone is made, the electronic device vibrates, or an indicator light flashes.

The Wi-Fi1 module and the Wi-Fi2 module are respectively configured to manage two Wi-Fi connections of the mobile phone, including establishing connections, disconnecting connections, maintaining connections, and storing fingerprint database information. Optionally, the fingerprint database information may also be referred to as historical connection information, where optionally, information related to the Wi-Fi network that has been connected is stored, including, but not limited to, at least one of the following: an SSID (Service Set Identifier, service set identifier), a BSSID, an account, a password, or an encryption method.

The DHCP1 module and the DHCP2 module are respectively configured to obtain and save DHCP information corresponding to the two Wi-Fi connections. The IP information includes, but is not limited to, at least one of the following: an IP address, a subnet mask, information related to a DNS server, or the like.

The database is configured to store a mapping relationship between the two Wi-Fi connections (for example, including a Wi-Fi1 connection and a Wi-Fi2 connection).

The Android Runtime includes a kernel library and a virtual machine. The Android runtime is responsible for scheduling and management of the Android system.

The core library includes two parts: one part is a performance function that the Java language needs to invoke, and the other part is a kernel library of Android.

The application layer and the application framework layer are run in the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of function modules, such as a surface manager (surface manager), a media library (Media Libraries), a three-dimensional graphics processing library (for example, OpenGL ES), and a 2D graphics engine (for example, SGL).

The surface manager is configured to manage a display subsystem, and provide fusion of 2D and 3D layers to a plurality of applications.

The media library supports playback and recording in a plurality of common audio and video formats, a static image file, and the like. The media library may support a plurality of audio and video encoding formats such as MPEG4, H.264, MP3, AAC, AMR, JPG, and PNG.

The three-dimensional graphics processing library is used to implement three-dimensional graphics drawing, image rendering, synthesis, layer processing, and the like.

The 2D graphics engine is a drawing engine for 2D drawings.

The kernel layer is a layer between hardware and software. The kernel layer includes at least a display drive, a camera drive, an audio drive, a sensor drive, a Wi-Fi drive, and the like.

It may be understood that, the components that are included in the application framework layer, the system library and runtime layer, and the kernel layer shown in FIG. 4 do not constitute a specific limitation on the mobile phone 100. In some other embodiments of this application, the mobile phone 100 may include more or fewer components than those shown in the figure, or combine some components, or split some components, or have different component arrangements.

The dual-band Wi-Fi mode in this embodiment of this application is described below in detail with reference to a specific scenario. It should be noted that, this embodiment of this application is described with only the dual-band Wi-Fi mode in which the mobile phone accesses a 2.4 GHz Wi-Fi network and a 5 GHz Wi-Fi network. In other embodiments. The technical solutions in this embodiment of this application are also applicable to a scenario in which two Wi-Fi networks are intra-band Wi-Fi networks, for example, both are 5 GHz Wi-Fi networks or both are 2.4 GHz Wi-Fi networks. Optionally, the technical solutions in this embodiment of this application may also be applicable to a multi-Wi-Fi mode, for example, the mobile phone may access three or more Wi-Fi networks simultaneously. Some or all of the Wi-Fi networks in the multi-Wi-Fi mode may be intra-band or inter-band networks, which is not limited in this application.

Figure 5A:
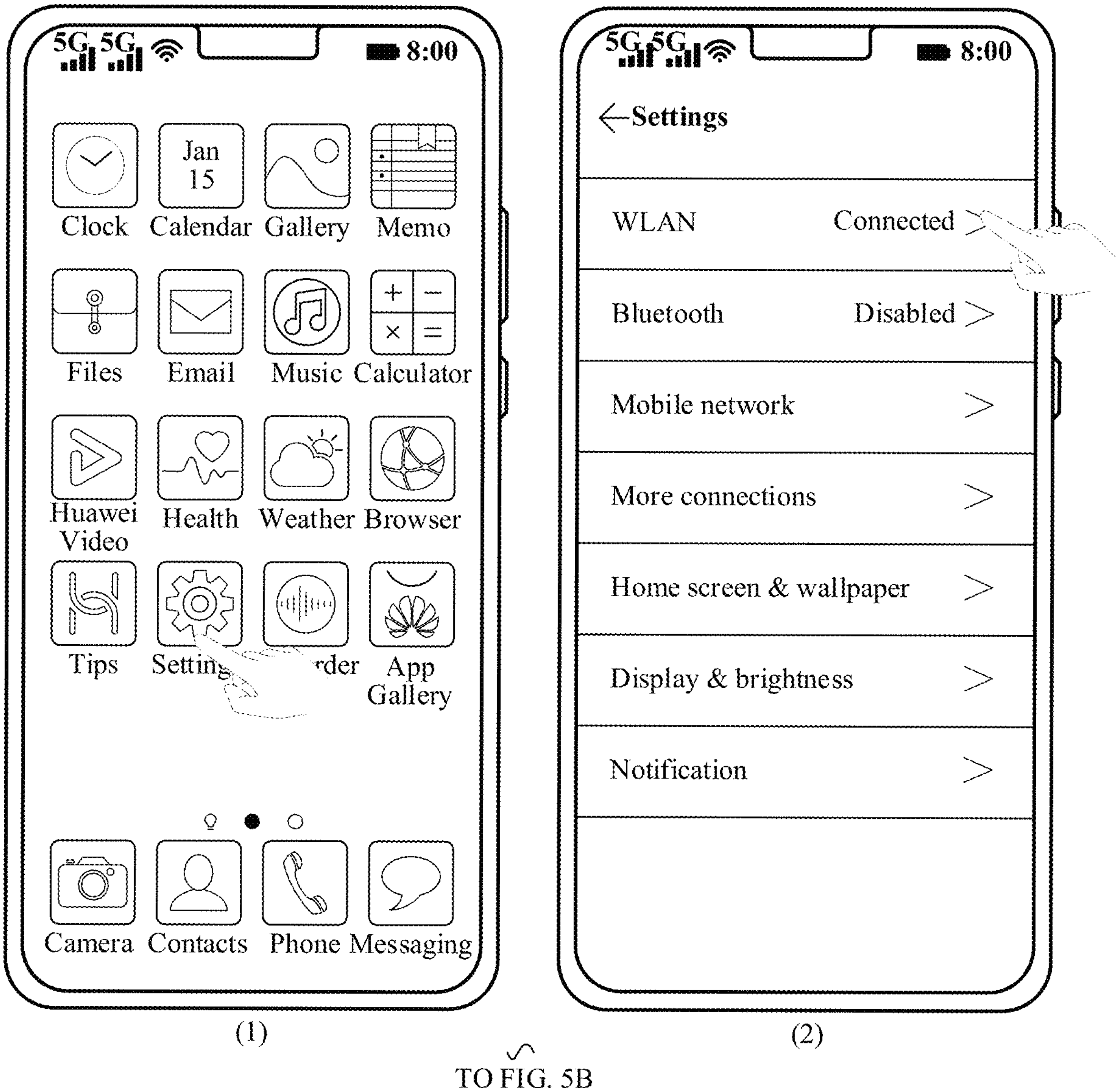
FIG. 5A and FIG. 5B illustrate schematic diagrams of a user interface.
Figure 5B:
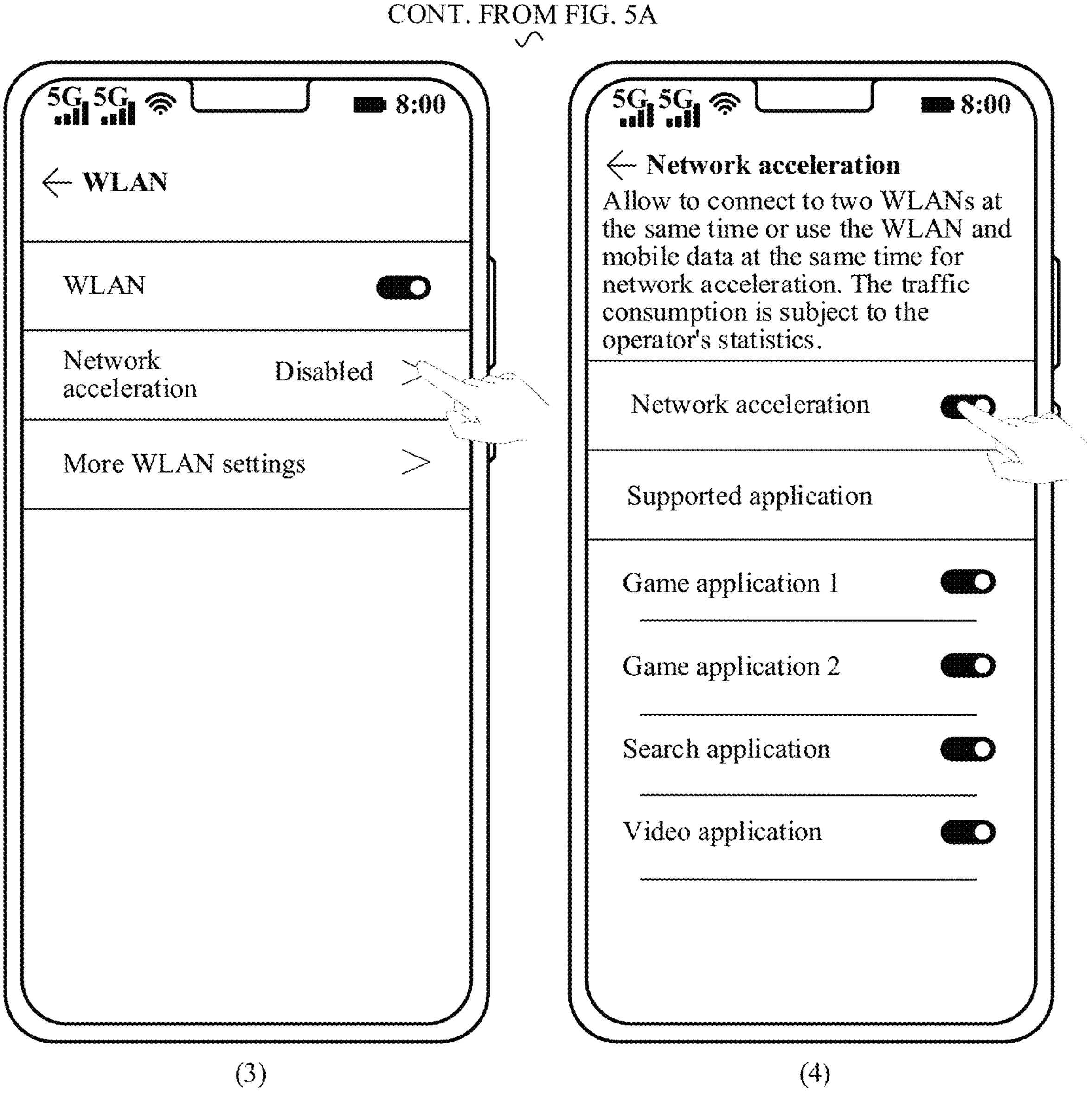

For example, FIG. 5A and FIG. 5B illustrates schematic diagrams of a user interface. Referring to (1) of FIG. 5A, for example, a display interface of the mobile phone includes one or more controls. Optionally, the controls include, but are not limited to, an application icon, a battery icon, a network icon, and the like. A user may click a setting icon, and the mobile phone displays a setting interface in response to the operation performed by the user. As shown in (2) of FIG. 5A, referring to (2) of FIG. 5A, for example, the setting interface includes one or more controls. The controls include, but are not limited to, a WLAN setting option, a Bluetooth setting option, a mobile network setting option, and the like. Optionally, the WLAN setting option and the Bluetooth setting option may further include prompt information to indicate whether the WLAN or Bluetooth is connected. For example, the user may click the WLAN setting option, and the mobile phone displays a WLAN setting interface in response to the operation performed the user. As shown in (3) of FIG. 5B, referring to (3) of FIG. 5B, for example, the WLAN setting interface includes one or more controls. The controls include, but are not limited to, a WLAN option, a network acceleration option, and the like. The user may click the network acceleration option, and the mobile phone displays a network acceleration setting interface in response to the operation performed by the user. As shown in (4) of FIG. 5B, for example, the network acceleration setting interface includes one or more controls. The controls include, but are not limited to, a network acceleration enable option, a list of supported applications, and the like. Optionally, the user may click the network acceleration enable option to enable a network acceleration function. After the network acceleration function is enabled, the mobile phone is allowed to access two Wi-Fi networks. Optionally, the list of supported applications may include one or more applications and corresponding enable options. The user may click the enable options corresponding to the one or more applications. It should be noted that, the applications of which corresponding enable options are triggered may optionally be applications that are allowed to perform network acceleration by using two Wi-Fi networks simultaneously or using two Wi-Fi networks and a mobile network simultaneously.

Figure 6:
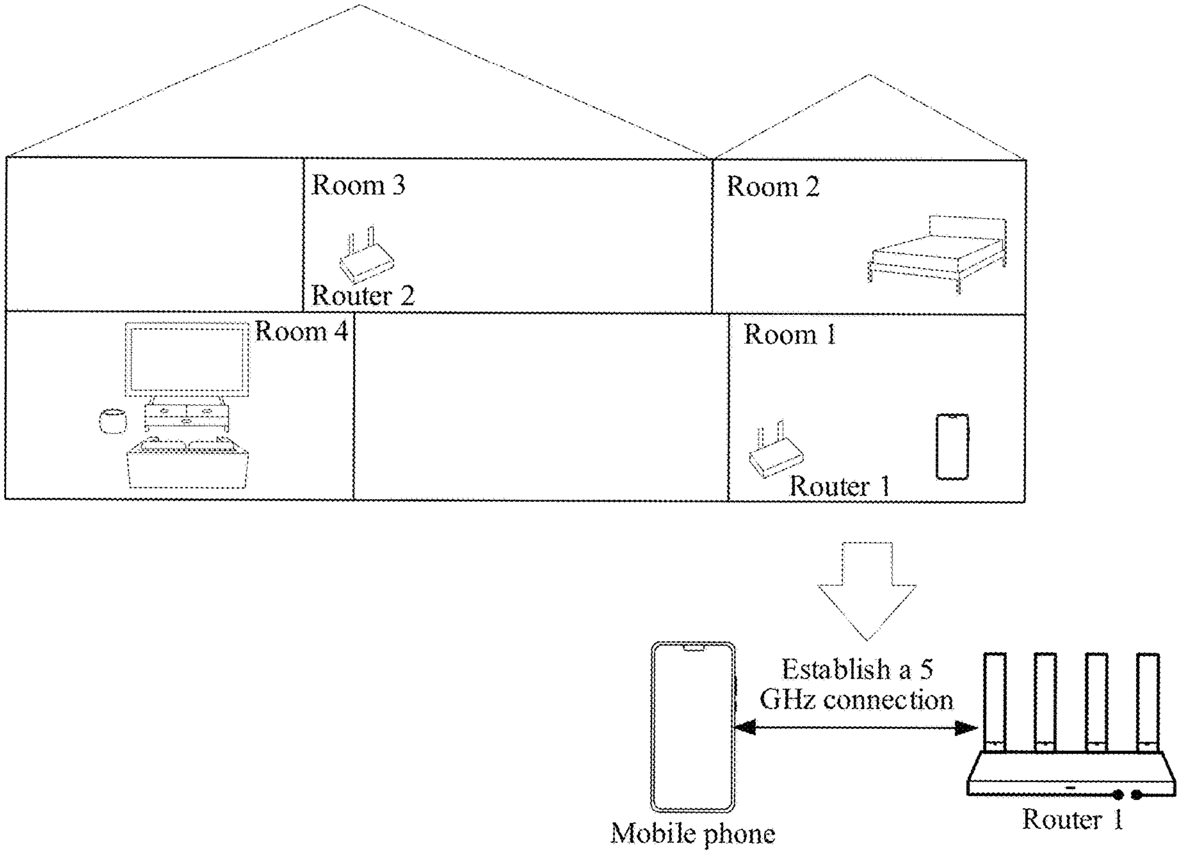
FIG. 6 illustrates a schematic diagram of an application scenario.

FIG. 6 illustrates an application scenario. Referring to FIG. 6, for example, a house of a user includes a room 1, a room 2, a room 3, a room 4, and the like. A router 1 is disposed in the room 1. The router is a 5 GHz router (which means that the router 1 works at a 5 GHz frequency band). A router 3 is disposed in the room 2. The router is a 2.4 GHz router (which means that the router 1 works at a 2.4 GHz frequency band). Devices, such as a smart screen and a smart speaker, are disposed in the room 4. It should be noted that, in the embodiments of this application, accessing a Wi-Fi network always refers to accessing a router (or an access point) in the Wi-Fi network, for example, that the mobile phone accesses a 5 GHz Wi-Fi network is optionally that the mobile phone accesses the router 1. Details are not described below again.

For example, the user holds a new mobile phone in the room 1, that is, the mobile phone has never accessed the router 1 and the router 2, that is, information related to the router 1 and the router 2 is not stored in the mobile phone. Optionally, the mobile phone may establish a 5 GHz connection with the router 1.

Figure 7:
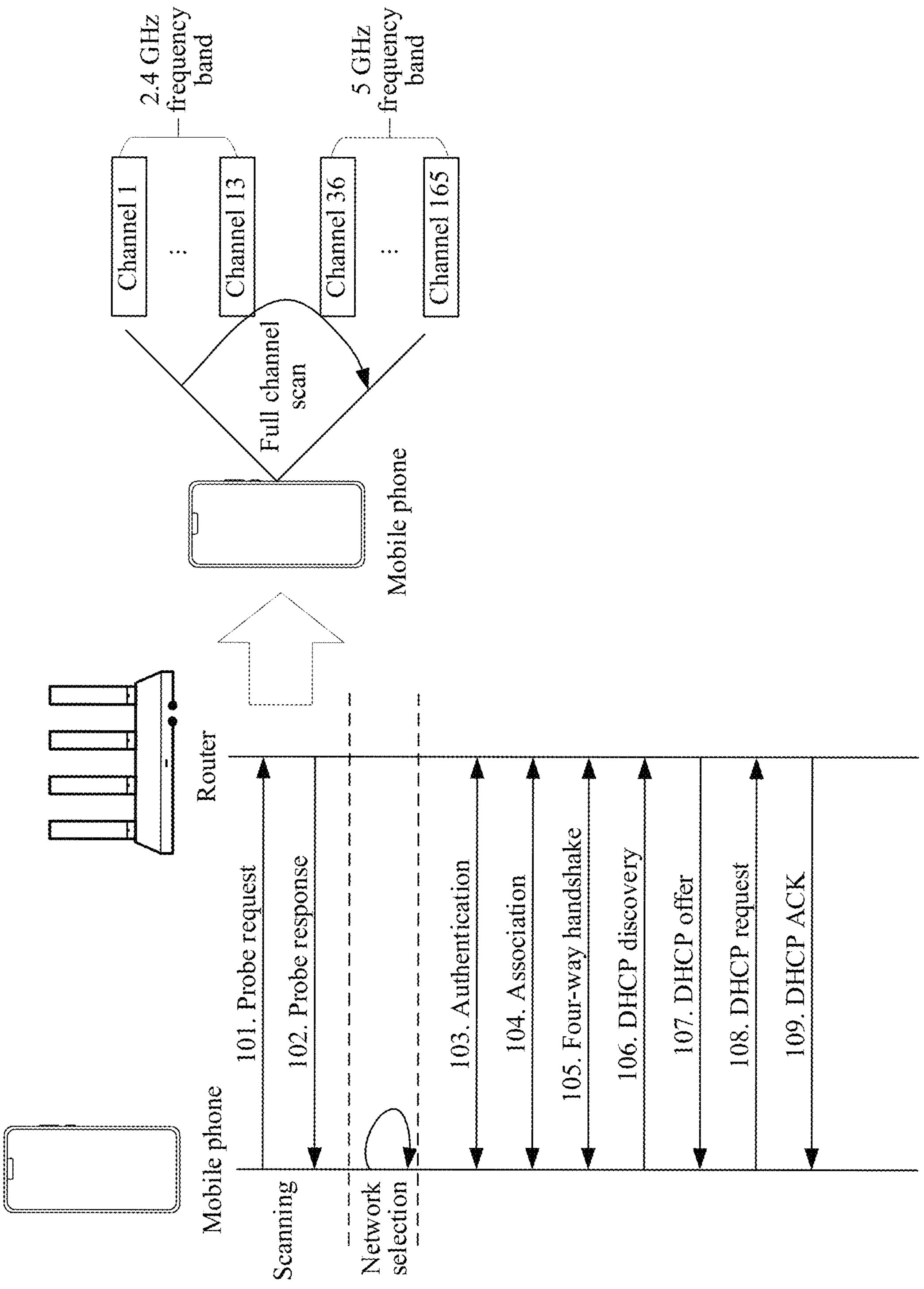
FIG. 7 illustrates a schematic diagram of a Wi-Fi connection process.

A Wi-Fi connection establishment method is described below in detail with reference to a schematic diagram of a Wi-Fi connection process shown in FIG. 7. Referring to FIG. 7, for example, connection steps include:

S101. A mobile phone sends a probe request (probe request) message to a router.

S102. The router sends a probe response (probe response) message to the mobile phone.

For example, the router is the router 1 in FIG. 6, that is, the router 1 is a 5 GHz router. Referring to FIG. 7, in a scanning phase, the mobile phone performs a full channel scan. As shown on the right side of FIG. 7, a 2.4 GHz frequency band includes a channel 1 to a channel 13, and a 5 GHz frequency band includes a channel 36 to a channel 165. The mobile phone sends the probe request message twice on each channel to detect whether there is a Wi-Fi network on the channel on which the probe request message is sent.

For example, if the mobile phone receives the probe response message returned by the router, the mobile phone may determine that there is a Wi-Fi network on the corresponding channel. Optionally, the probe response message includes, but is not limited to, BSSID information, SSID information, and the like of a router. The BSSID is equivalent to a MAC address and is used for uniquely identifying a Wi-Fi network interface of the router. For example, a dual-band integrated router includes two Wi-Fi network interfaces (that is, two access points). Each Wi-Fi network interface corresponds to one BSSID, and the two BSSIDs are different.

For example, each time after sending a probe request message, the mobile phone waits for 20 ms, to detect whether a probe response message returned by the router on the channel is received. It should be noted that, according to a channel on which the mobile phone receives a probe response message, the channel on which the router that sends the probe response message works can be determined. For example, after the mobile phone sends a probe message on the channel 1, and receives a probe response message returned by the router 2 on the channel 1, the mobile phone can determine that the channel on which the router 2 works is the channel 1 in the 2.4 GHz frequency band.

Figure 8:
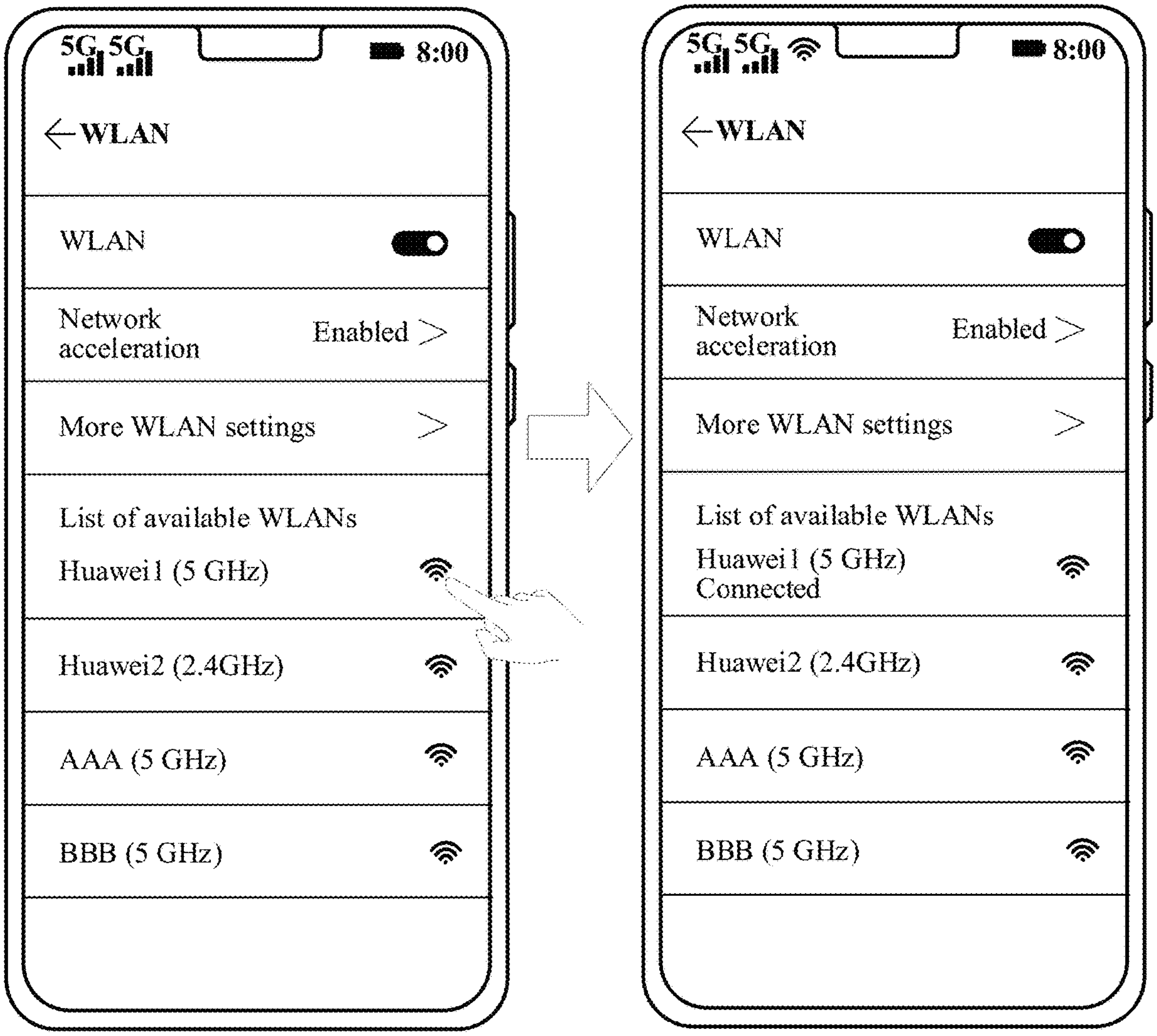
FIG. 8 illustrates a schematic diagram of a user interface.

For example, the mobile phone displays a scanning result after all channels, that is, the channel 1 to channel 13 and the channel 36 to channel 165 are scanned. In the scanning result, the Wi-Fi network corresponding to the router that returns the probe response message (and the mobile phone successfully receives the probe response message) is displayed. As shown in FIG. 8, referring to FIG. 8, for example, the mobile phone finds through scanning Wi-Fi networks named Huawei1 (which is the Wi-Fi network corresponding to the router 1 in this embodiment of this application), AAA, and BBB in the 5 GHz frequency band. The Wi-Fi networks may be on the same channel or different channels in the 5 GHz frequency band, which is not limited in this application. For example, the mobile phone further finds through scanning a Wi-Fi network named Huawei2 (which is the Wi-Fi network corresponding to the router 2 in this embodiment of this application) in a 2.4 GHz frequency band.

Figure 9:
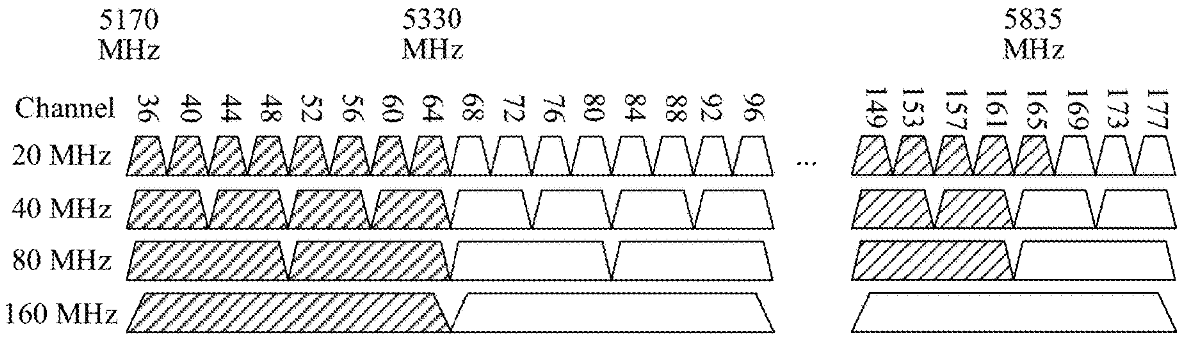
FIG. 9 illustrates a resource distribution diagram.

To make correspondences between frequency bands and channels in this application better understood, the correspondences between frequency bands and channels are briefly described below with reference to FIG. 9. FIG. 9 illustrates a resource distribution diagram of 5 GHz. A frequency band of 5 GHz ranges from 5170 MHz to 5835 MHz, and its available channels include a channel 36 to a channel 165. The shaded parts in FIG. 9 illustrate 5 GHz channels currently available in China, including a channel 36 to a channel 64 and a channel 149 to a channel 165. Optionally, in a scanning phase, the mobile phone may scan all channels (the channel 36 to the channel 165) in a 5 GHz frequency band one by one. Optionally, the mobile phone may also scan only the channels available in China (the channel 36 to the channel 64 and the channel 149 to the channel 165) one by one, which is not limited in this application. It should be noted that, available channels of 2.4 GHz are a channel 1 to a channel 13. The resource distribution of the channels of 2.4 GHz is similar to that of the channels of 5 GHz. Details are not described herein again.

Referring to FIG. 7 again, for example, after the scanning phase is completed, the mobile phone performs a network selection phase. In the network selection phase, the mobile phone may obtain signal strength of a corresponding Wi-Fi network based on a received probe response message, and the mobile phone may select and access, based on a specified network selection condition, one Wi-Fi network in one or more Wi-Fi networks found through scanning.

Optionally, the network selection condition includes, but is not limited to, at least one of the following: a communication quality parameter of a Wi-Fi network, historical connection information, an encryption method, user designation, or the like.

For example, the mobile phone scans and displays a plurality of Wi-Fi networks as shown in FIG. 8, and the user may click the Huawei1 (a Wi-Fi network in a 5 GHz frequency band) option, to specify a network to connect to. In response to the operation performed by the user, the mobile phone may select this network in the network selection phase, and perform a subsequent access process, that is, establish a 5 GHz connection with the router 1 corresponding to the Huawei1 network. Optionally, if the Huawei1 network is an encrypted network, the mobile phone displays a prompt box on a WLAN setting interface in response to the operation performed by the user. The prompt box includes a password input box, and the user can enter a password in the password input box. Optionally, if the Huawei1 network is an unencrypted network, the mobile phone directly performs the subsequent access process in response to the operation performed by the user.

For example, the communication quality parameter of a Wi-Fi network includes, but is not limited to, an SNR (SIGNAL NOISE RATIO, signal-to-noise ratio), RSRP (Reference Signal Receiving Power, reference signal received power), RSRQ (Reference Signal Receiving Quality, reference signal received quality), RSSI (Received Signal Strength Indication, received signal strength indication), and the like. For example, if the mobile phone does not detect an operation performed by the user, the mobile phone may select and access a network of which the communication quality parameter is the best and the communication quality parameter of the network exceeds a threshold (which may be set according to requirements) in a plurality of Wi-Fi networks. It should be noted that, if none of communication quality parameters of Wi-Fi networks found through scanning exceeds the threshold, optionally, the mobile phone may perform a scan operation again or wait for the user to choose.

For example, the historical connection information is used for indicating that the mobile phone has accessed the Wi-Fi network before, for example, information, such as a BSSID, an SSID, and the like of the Wi-Fi network, is stored. Optionally, if the Wi-Fi network is an encrypted network, the historical connection information may further include information, such as an account and a password, of the encrypted network. For example, if the mobile phone does not detect an operation performed by the user, the mobile phone may match a BSSID of each Wi-Fi network in the plurality of Wi-Fi networks with BSSIDs that are recorded in the historical connection information and that are of a plurality of Wi-Fi networks that have been accessed before, and select and access a Wi-Fi network that has been accessed before (that is, successfully matched). Optionally, if a plurality of Wi-Fi networks that have been connected before are matched, the mobile phone optionally accesses a Wi-Fi network with the highest signal strength.

For example, the encryption method is used for representing a security degree of a Wi-Fi network. Optionally, the encryption method includes, but is not limited to, methods such as Open, PSK, WPA2, and WPA3. For example, if the mobile phone does not detect an operation performed by the user, the mobile phone accesses a network with a specified encryption method (such as WPA3) in the plurality of Wi-Fi networks.

S103. The mobile phone and the router perform authentication processing.

S104. The mobile phone and the router perform association processing.

S105. The mobile phone and the router perform a four-way handshake phase.

For example, after the mobile phone selects the corresponding network in the network selection phase, S103 to S105 may be performed. In fact, in S103 to S105, the mobile phone and the router perform a plurality of signaling interactions, for example, for a password of an encrypted network entered by the user, optionally, verification is performed on the entered password in the four-way handshake phase. For details, reference may be made to the detailed description in the 802.11 protocol. Details are not described in this application again.

By then, the mobile phone successfully establishes a Wi-Fi connection with the router 1. Optionally, the mobile phone writes information related to the Wi-Fi1 network into the historical connection information, where the relevant information includes, but is not limited to, BSSID information, an account, a password, and the like.

It should be noted that, after establishing the Wi-Fi connection with the router, the mobile phone also needs to perform a DHCP process to complete the process of accessing the router and have a network access capability.

Referring to FIG. 7 again, the DHCP process specifically includes:

S106. The mobile phone sends a DHCP discovery message to the router.

For example, the mobile phone sends the DHCP discovery message to the router. Optionally, the message carries a DHCP MAC address of the mobile phone.

It should be noted that, referring to FIG. 4, in the framework layer, the two Wi-Fi radio frequency circuits in the mobile phone correspond to the Wi-Fi1 module and DHCP1 module and the Wi-Fi2 module and DHCP2 module respectively. In S106, if a Wi-Fi1 connection is currently established, the DHCP discovery message carries a MAC address of the DHCP1 module. If a Wi-Fi2 connection is currently established, the DHCP discovery message carries a MAC address of the DHCP2 module.

It should be further noted that, to distinguish different Wi-Fi networks accessed by the mobile phone and corresponding connections, in the description of this embodiment of this application, the Wi-Fi1 connection may be referred to as a main connection, and optionally, be a Wi-Fi connection established by the mobile phone first. The Wi-Fi2 connection may be referred to as an auxiliary connection, and optionally, be a Wi-Fi connection established by the mobile phone later, that is, a second Wi-Fi connection. That is, in this embodiment of this application, Wi-Fi1 and Wi-Fi2 are used for a person skilled in the art to better understand a sequence of establishing the two Wi-Fi connections of the mobile phone. For example, using FIG. 6 as an example, if the mobile phone first establishes a 5 GHz connection with the router 1, and then establishes a 2.4 GHz connection with the router 2 while maintaining the 5 GHz connection, the 5 GHz connection is referred to as the Wi-Fi1 connection, and the 2.4 GHz connection is referred to as the Wi-Fi2 connection. Correspondingly, the 5 GHz Wi-Fi network corresponding to the router 1 is referred to as the Wi-Fi1 network, and the 2.4 GHz Wi-Fi network corresponding to the router 2 is referred to as the Wi-Fi2 network. If the mobile phone first establishes a 2.4 GHz connection with the router 2, and then establishes a 5 GHz connection with the router 1 while maintaining the 2.4 GHz connection, the 2.4 GHz connection is referred to as the Wi-Fi1 connection, and the 5 GHz connection is referred to as the Wi-Fi2 connection. Correspondingly, the 2.4 GHz Wi-Fi network corresponding to the router 2 is referred to as the Wi-Fi1 network, and the 5 GHz Wi-Fi network corresponding to the router 1 is referred to as the Wi-Fi2 network. Details are not described below again.

S107. The router sends a DHCP offer message to the mobile phone.

For example, the router sends the DHCP offer message to the mobile phone. Optionally, the message carries DHCP information assigned by the router based on the MAC address of the DHCP module. Optionally, the DHCP information includes IP address information, subnet mask information, DNS (Domain Name System, domain name system) server information, and the like.

S108. The mobile phone sends a DHCP request message to the router.

For example, based on the received DHCP information, after determining that the DHCP information can be used, the mobile phone sends the DHCP request message to the router. Optionally, the message carries IP address information to indicate that the mobile phone will use the IP address information. It should be noted that, the IP address information is the IP address information assigned by the router to the mobile phone in S107.

S109. The router sends a DHCP ACK (Acknowledge character, acknowledge character) message to the mobile phone.

For example, after receiving the DHCP request message from the mobile phone, the router sends the DHCP ACK message to the mobile phone, to indicate that the router has successfully received the DHCP request message from the mobile phone and the mobile phone can use the DHCP information to access a network.

Referring to FIG. 6 again, after the mobile phone and the router 1 perform the steps in S101 to S108, the mobile phone accesses the router 1 and has a network access function, that is, the mobile phone can access a network through the 5 GHz connection with the router 1 based on the obtained DHCP information.

For example, still referring to FIG. 8, after the mobile phone and the router 1 complete the foregoing interaction, a Wi-Fi connection icon is displayed on the network icon control of the mobile phone. In addition, in the WLAN setting interface, connection prompt information is displayed in the option of the accessed Huawei1 network, to indicate that the mobile phone has been connected to the Wi-Fi network corresponding to Huawei1. It may also be understood that the mobile phone has accessed the router 1.

Figure 10:
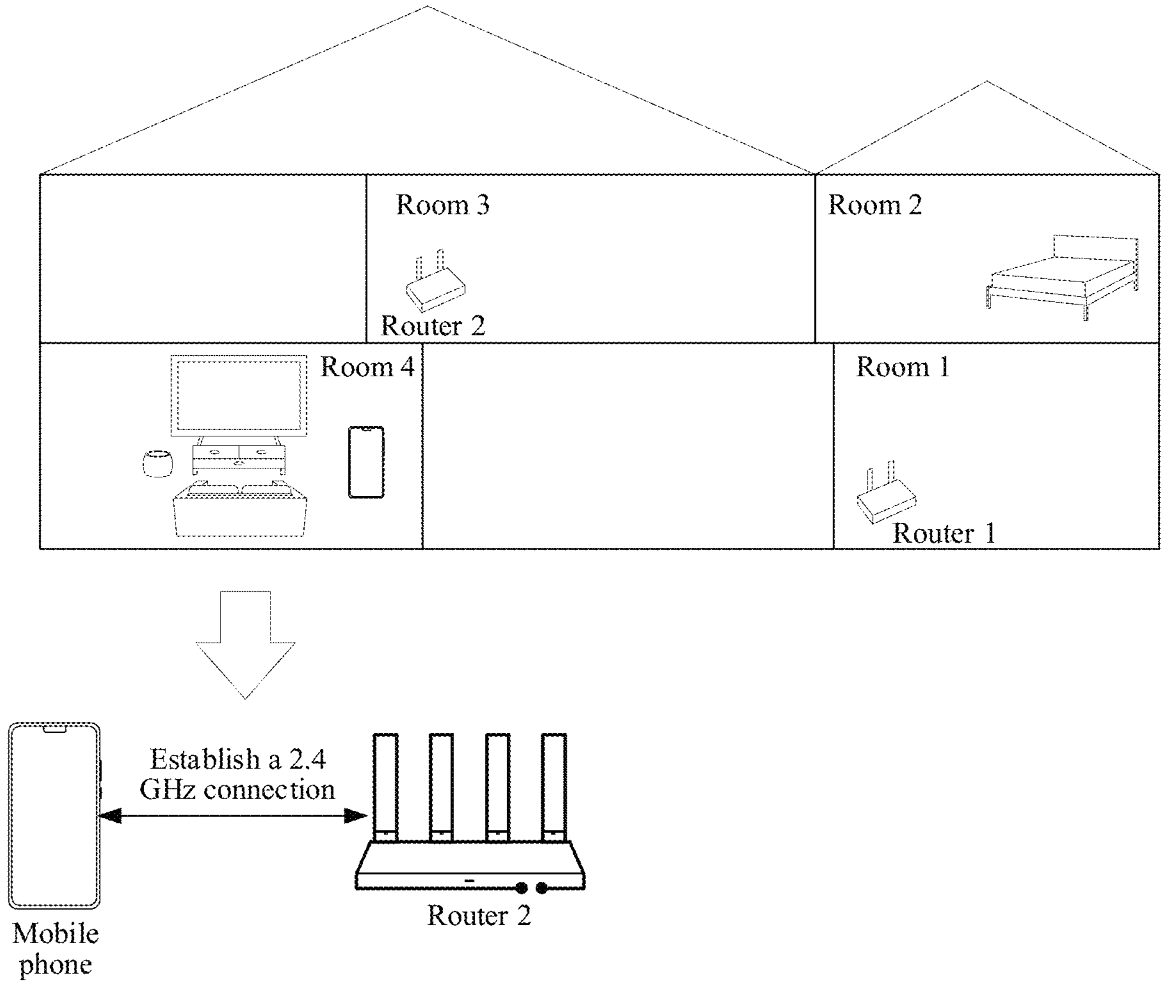
FIG. 10 illustrates a schematic diagram of an application scenario.

Based on FIG. 6, FIG. 10 is a schematic diagram of another application scenario. Referring to FIG. 10, for example, the user moves into the room 4 with the mobile phone. In this case, a signal of the 5 GHz Wi-Fi network of the router 1 needs to penetrate two walls before reaching the room 4. The signal strength after attenuation is weak, which increases the data transmission latency of the mobile phone.

For example, as described above, the mobile phone has enabled the network acceleration function. In a case that the mobile phone detects that the signal of the currently connected Wi-Fi network is weak, the mobile phone initiates a Wi-Fi2 network access process.

The process of accessing the Wi-Fi2 network is similar to that of accessing the Wi-Fi1 network (that is, accessing the router 1). The mobile phone performs a scanning phase, a network selection phase, and other phases to access the Wi-Fi2 network. Different from the process of accessing the Wi-Fi1 network, the mobile phone is a device with a dual-band connection function, that is, the two Wi-Fi connections connected to the mobile phone are inter-band connections. Correspondingly, in a case that the Wi-Fi1 currently connected to the mobile phone is on 5 GHz, the mobile phone only needs to scan the channels (including the channel 1 to the channel 13) in the 2.4 GHz frequency band in the process of connecting to Wi-Fi2. Optionally, if the mobile phone has an intra-band and/or inter-band connection function, in the scanning phase of accessing Wi-Fi2, the mobile phone may scan all channels in the 5 GHz frequency band and the 2.4 GHz frequency band. Optionally, in the phase of accessing the Wi-Fi2 network, data transmission of the current Wi-Fi1 network may be affected, for example, has a data transmission latency slightly increased, or may not be affected. Whether the data transmission is affected depends on the design of a Wi-Fi chip in the mobile phone, which is not limited in this application.

Referring to FIG. 10 again, as described above, after the mobile phone finds through scanning networks on the channels, in the network selection phase, the network selection is performed based on the network selection condition (refer to the above). In this example, since the mobile phone is a new mobile phone, that is, the mobile phone has never accessed the router 2, that is, there is no information related to the Wi-Fi network corresponding to the router 2 in the historical connection information that is stored in the mobile phone. Therefore, before the user manually selects a network, the mobile phone cannot automatically access the router 2 and any other Wi-Fi2 network.

For example, the user may manually choose to access the Wi-Fi network of the router 2. Specifically, referring to FIG. 8, the user may select a network corresponding to the router 2, that is, the Wi-Fi network named Huawei2. For example, the WLAN setting interface may display that this network is a 2.4 GHz network. The mobile phone accesses the Wi-Fi network in response to the operation performed by the user. Optionally, if the network is an encrypted network, the mobile phone may display a prompt box. The prompt box includes a password input box, and the user enters a password in the password input box to access the Wi-Fi network.

For example, after the network selection is completed, for the specific manner in which the mobile phone accesses the router 2, refer to S103 to S109. Details are not described herein again.

Figure 11:
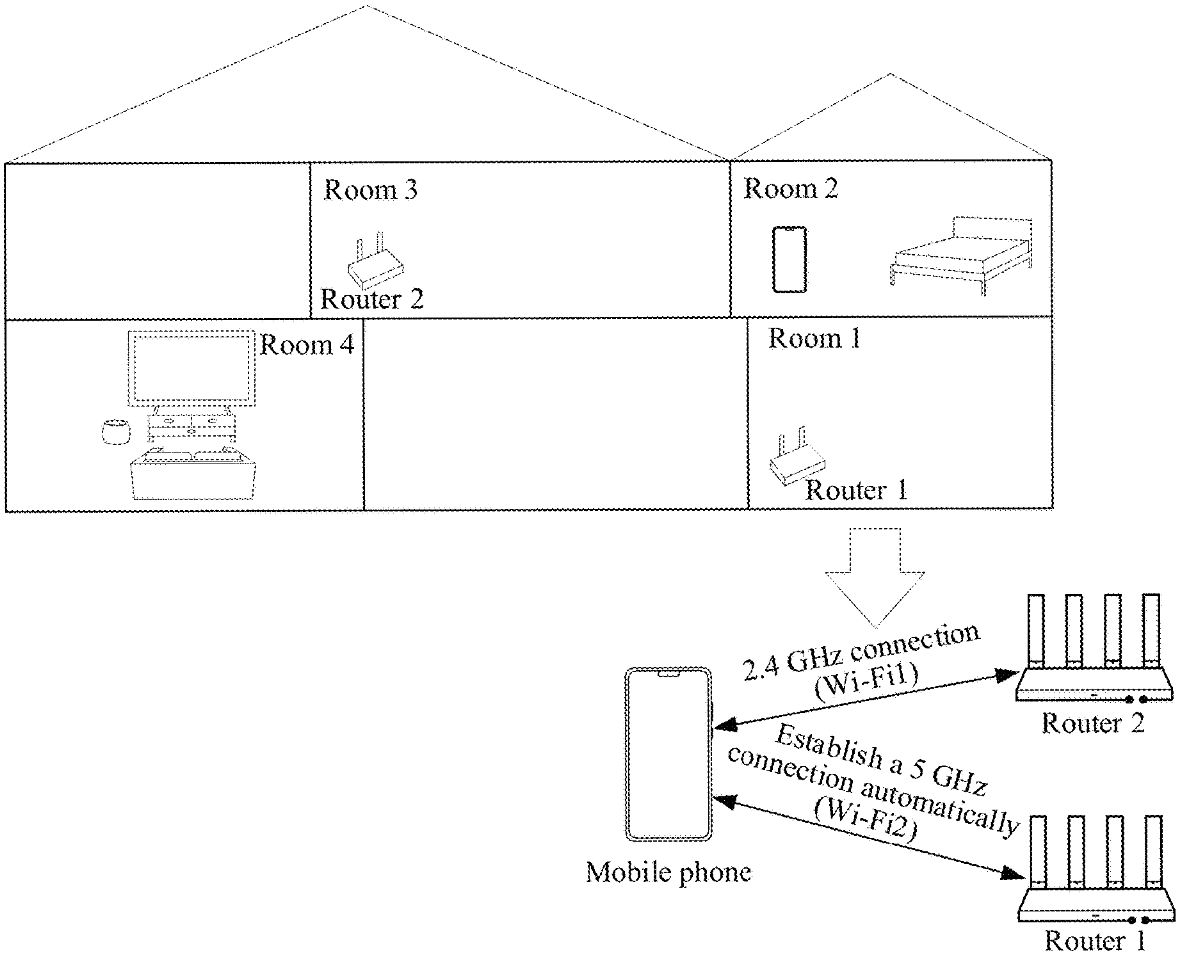
FIG. 11 illustrates a schematic diagram of an application scenario.

Based on FIG. 10, FIG. 11 is a schematic diagram of another application scenario. Referring to FIG. 11, for example, after the mobile phone has accessed the router 2, the user moves into the room 2 with the mobile phone.

For example, the mobile phone may initiate a Wi-Fi2 connection establishment process based on the network acceleration condition when it is determined that the network acceleration function needs to be implemented, that is, a dual-band connection needs to be established. It should be noted that, as described above, the Wi-Fi network accessed first is referred to as the Wi-Fi1 network of which a corresponding connection is referred to as the Wi-Fi1 connection, and the Wi-Fi network accessed later is the Wi-Fi2 network of which a corresponding connection is referred to as the Wi-Fi2 connection. In this example, a 2.4 GHz network currently accessed by the mobile phone is the Wi-Fi1 network, and a 5 GHz network to be accessed later is the Wi-Fi2 network.

Referring to FIG. 11 again, for example, after the mobile phone determines, based on the network acceleration condition, that the network acceleration function needs to be implemented, the mobile phone establishes the 5 GHz connection (also referred to as the Wi-Fi2 connection) with the router 1, and performs the DHCP process. Specifically, as described above, the mobile phone accesses the 2.4 GHz network currently. Therefore, in the process of accessing the Wi-Fi2 network, the mobile phone needs to scan only channels in the 5 GHz frequency band. Then, the mobile phone performs the network selection phase. As described above, in the scenario shown in FIG. 6, the mobile phone has accessed the router 1 before, and wrote the relevant information into the historical connection information. Therefore, in the network selection phase, the mobile phone may, based on the historical connection information, determine that the mobile phone has accessed the network of the router 1 (that is, the Huawei1 network) before and stored the corresponding fingerprint database information (such as the password and the like). The mobile phone may access the router 1 based on the historical connection information of the Huawei1 network, and perform the subsequent DHCP process. For the undescribed content in the process of accessing the router 1 by the mobile phone, refer to the above. Details are not described herein again.

In a possible implementation, the network acceleration condition in this embodiment of this application includes, but is not limited to, at least one of the following: a communication quality parameter of a Wi-Fi1 connection being lower than a threshold, an application requirement, or the like. For example, if the mobile phone detects that the communication quality parameter of the Wi-Fi1 network is lower than the threshold, the mobile phone initiates a Wi-Fi2 network access process (that is, starts a scanning phase). Optionally, the communication quality parameter includes at least one of the following parameters: an SNR (SIGNAL NOISE RATIO, signal-to-noise ratio), RSRP (Reference Signal Receiving Power, reference signal received power), RSRQ (Reference Signal Receiving Quality, reference signal received quality), RSSI (Received Signal Strength Indication, received signal strength indication), transmission latency, and the like. For example, as shown in FIG. 5A and FIG. 5B, the network acceleration setting interface includes a supported application option, and the supported-application option includes a list of supported applications. Optionally, if any application in the list of supported applications is started, the mobile phone may initiate the Wi-Fi2 network access process.

In another possible implementation, the user may also manually choose to access the Wi-Fi2 network. For example, the network acceleration setting interface may also include an available-extended-network option. After the user clicks this option, the mobile phone displays an available-extended-network interface in response to the operation performed by the user. For example, the available-extended-network interface may include prompt information used for indicating that an available extended network is a network different from the main Wi-Fi network (that is, the Wi-Fi1 network in this embodiment of this application). The available-extended-network interface may further include a list of available extended networks, and the list includes network names corresponding to the networks found through scanning in the scanning phase. The user may click any network name to instruct the mobile phone to access the network.

In another possible implementation, after the user enables the network acceleration function, the mobile phone may also automatically access the Wi-Fi1 network and the Wi-Fi2 network after finding accessible Wi-Fi networks through scanning.

Figure 12:
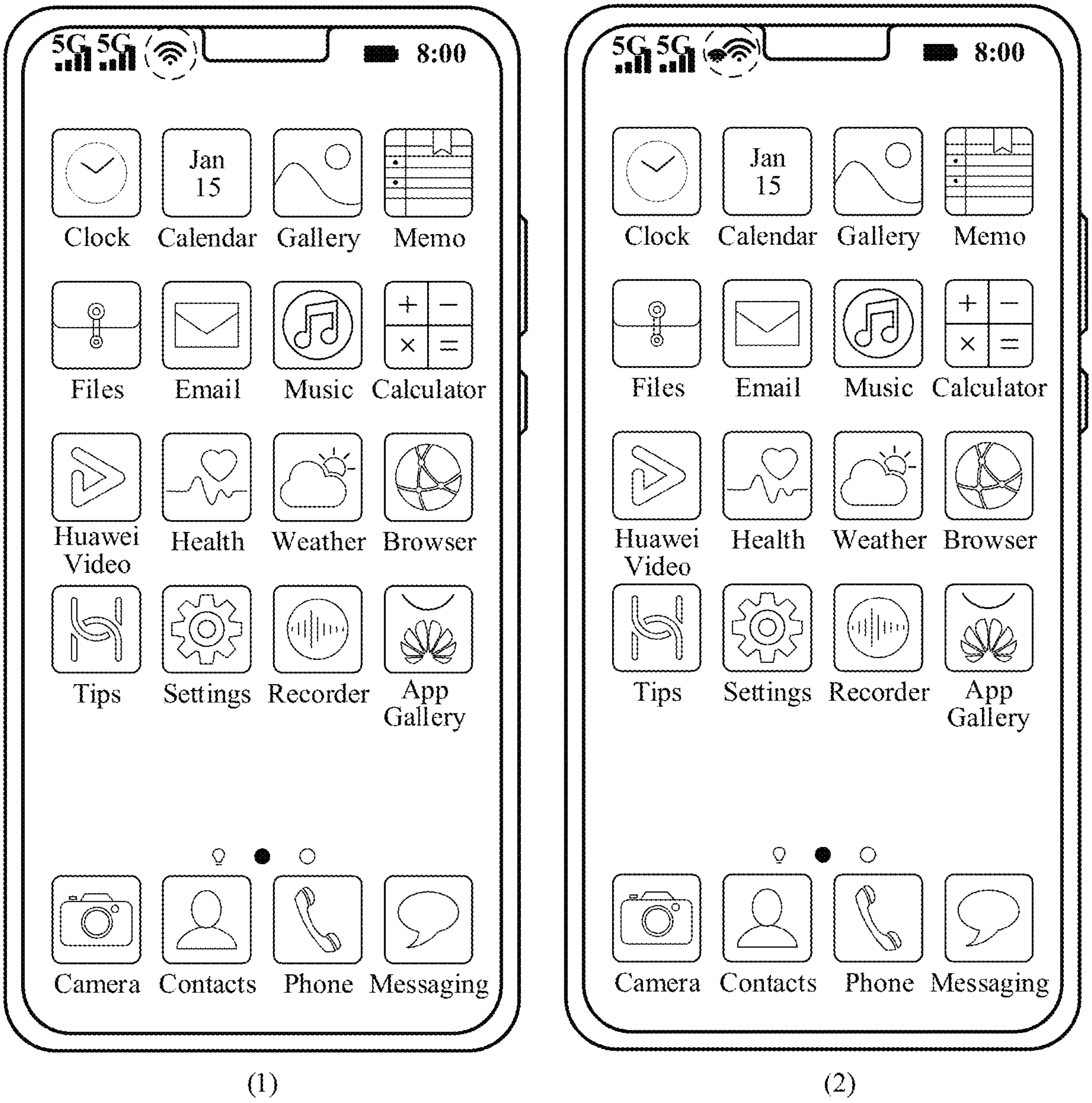
FIG. 12 illustrates a schematic diagram of a user interface.

For example, referring to FIG. 12, in a network icon in a display interface of the mobile phone, in the case that the mobile phone accesses only the router 2 currently, a Wi-Fi network icon displayed in the network icon is as shown in FIG. 12(1). In a case that the mobile phone accesses the router 1 and the router 2 respectively, the Wi-Fi network icons are as shown in FIG. 12(2), that is, one large Wi-Fi network icon and one small Wi-Fi network icon are included. The large Wi-Fi network icon is used for indicating an accessed Wi-Fi1 network (for example, the 2.4 GHz network in FIG. 11), and the small Wi-Fi network icon is used for indicating an accessed Wi-Fi2 network (for example, the 5 GHz network in FIG. 11). For example, if the large Wi-Fi network icon includes two bars, it means that signal strength of the Wi-Fi1 network is two bars. It should be noted that, the Wi-Fi icon shown in FIG. 12 is only a schematic example, and does not impose a limitation in this application.

Figure 13:
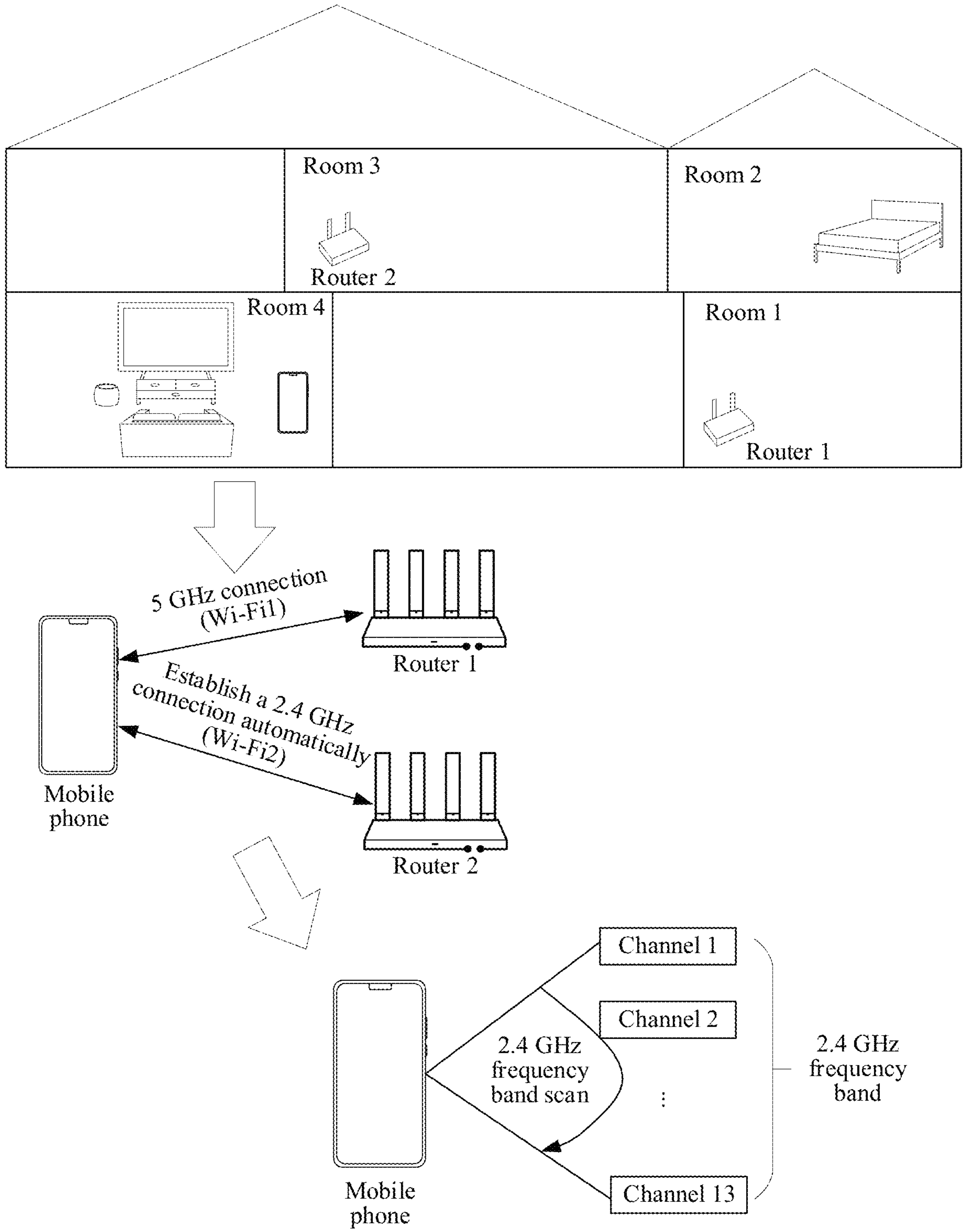
FIG. 13 illustrates a schematic diagram of an application scenario.

Based on FIG. 11, FIG. 13 illustrates an application scenario. For example, after the user leaves home, connections between the mobile phone and the router 1 and the router 2 are both disconnected. Referring to FIG. 13, after the user returns home, in a case that the WLAN function is enabled, the mobile phone finds a plurality of networks in the scanning phase (still referring to FIG. 8) through scanning. In the network selection phase, if both the signal strength of the 5 GHz network (for example, Huawei1) and the signal strength of the 2.4 GHz network (for example, Huawei2) exceed the threshold, and the mobile phone stores historical connection information of the two networks, the mobile phone preferentially selects the 5 GHz network to perform an access process. For example, the mobile phone accesses the router 1, that is, accesses the 5 GHz network. For the specific access process, refer to the related description in FIG. 7. Details are not described herein again.

Referring to FIG. 13 again, for example, the user moves into the room 4 with the mobile phone. As described above, after signal transmission of the router 1 is attenuated, strength of the signal reaching the room 4 is weak, resulting in a relatively large data transmission latency. Correspondingly, when detecting that the signal of the current 5 GHz connection (that is, the Wi-Fi1 connection) is relatively weak, the mobile phone automatically initiates a Wi-Fi2 connection establishment process to access the 2.4 GHz network corresponding to the router 2. It should be noted that, this embodiment is described with only an example in which the mobile phone determines, based on the strength of the signal, that the Wi-Fi2 connection needs to be established. In other embodiments, the mobile phone may initiate the Wi-Fi2 connection establishment process based on any one of the network acceleration conditions described above.

Still referring to FIG. 13, for example, the mobile phone currently has accessed the 5 GHz network. Therefore, in the process of accessing the Wi-Fi2 network, the mobile phone needs to scan channels in the 2.4 GHz frequency band. When finding the Huawei2 network corresponding to the router 2 through scanning, the mobile phone may access the router 2, that is, the Wi-Fi2 network (Huawei2 network), based on a historical connection record. For undescribed content, refer to the related description in FIG. 11. Details are not described herein again.

To sum up, by accessing two inter-band networks (or intra-band networks), the mobile phone can effectively improve the network throughput and reduce the data transmission latency.

Figure 14:
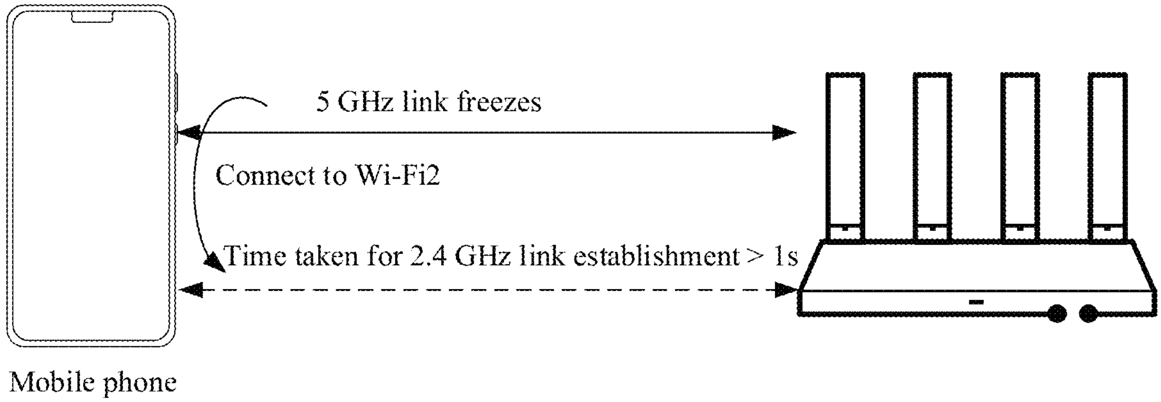
FIG. 14 illustrates a schematic diagram of a dual-band connection scenario.

It should be noted that, each time the mobile phone performs the process of accessing the Wi-Fi2 network, in the scanning process, all channels in the 2.4 GHz frequency band or the 5 GHz frequency band need to be scanned, and each channel needs to be scanned twice in the scanning process, that is, a probe request message is sent twice. In addition, after the probe request message is sent each time, the mobile phone waits for 20 ms to detect whether a corresponding probe response message is received. The scanning process may take longer than 700 ms. Correspondingly, it may take more than 1 s for the mobile phone to successfully access the Wi-Fi2 network. As shown in FIG. 14, using establishment of a dual-band connection between a mobile phone and a dual-band integrated router as an example, for example, after the mobile phone establishes a 5 GHz connection with the router, a user may use the mobile phone to run a game application. During running of the game application, assuming that the data transmission latency on the 5 GHz connection is relatively large, the mobile phone initiates a Wi-Fi2 access process, that is, the mobile phone establishes a 2.4 GHz connection with the router. As described above, the successful establishment of the 2.4 GHz connection takes more than 1 s, that is, within 1 s, the game application is still in a frozen state, which affects the user experience.

Figure 15:
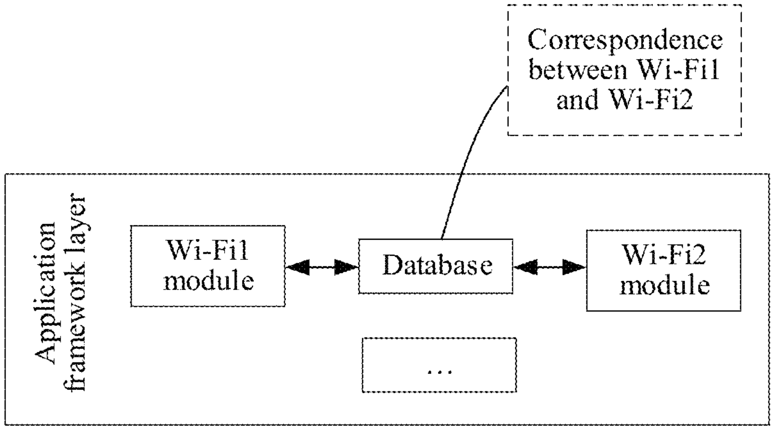
FIG. 15 is a schematic diagram of a principle of a dual-band connection according to an embodiment of this application.

To speed up the Wi-Fi2 network access process, an embodiment of this application further provides an implementation of a dual-band connection. Referring to FIG. 15, specifically, after a Wi-Fi1 module and a Wi-Fi2 module respectively establish corresponding connections, the Wi-Fi1 module may write obtained network information of a Wi-Fi1 network into a database, and the Wi-Fi2 module may write obtained network information of a Wi-Fi2 network to the database. The network information of the Wi-Fi1 network and the network information of the Wi-Fi2 network are correspondingly stored in the database to indicate a correspondence between the Wi-Fi1 network and the Wi-Fi2 network. Subsequently, when the Wi-Fi2 module initiates the Wi-Fi2 network access process again, the Wi-Fi2 module may obtain the network information of the Wi-Fi2 network based on the correspondence between the network information of the Wi-Fi1 network and the network information of the Wi-Fi2 network that are stored in the database, and may quickly initiate the Wi-Fi2 network access process based on the obtained network information. The foregoing content is described below in detail with reference to specific embodiments.

Referring to FIG. 11 again, for example, after the mobile phone accesses the router 2 and the router 1 simultaneously for the first time, that is, accesses the Wi-Fi1 network (2.4 GHz network) and the Wi-Fi2 network (5 GHz network), the Wi-Fi1 module writes network information of the 2.4 GHz network into the database, the Wi-Fi2 module writes network information of the 5 GHz network into the database, and the database stores both the pieces of network information correspondingly. Optionally, the network information includes, but is not limited to, an SSID, a BSSID, channel information, and the like. For example, the network information of the Wi-Fi1 network includes, but is not limited to, SSID1, BSSID1, and a channel 1. The network information of the Wi-Fi2 network includes, but is not limited to, SSID2, BSSID2, and a channel 36. It should be noted that, in all the embodiments of this application, descriptions are provided by using an example in which the channel information is a channel number. That is, an electronic device in the embodiments of this application may determine a frequency corresponding to a channel based on a channel number, and scans on the frequency corresponding to the channel in a scanning process. Optionally, in other embodiments, the channel information is optionally frequency information (center frequency information) of a channel, which is not limited in this application. It should be further noted that, the network information recorded in the database may further include MAC address information of routers corresponding to connections and the like, which is not limited in this application.

Optionally, the database may maintain a correspondence list, as shown in Table 1:

TABLE 1

| Wi-Fi1 SSID | Wi-Fi1 BSSID | Wi-Fi1 Channel | Wi-Fi2 SSID | Wi-Fi2 BSSID | Wi-Fi2 Channel | Write Time |
|---|---|---|---|---|---|---|
| SSID1 | BSSID1 | 1 | SSID2 | BSSID2 | 36 | XX |

SSID1 may be the same as or different from SSID2. For example, in all the embodiments of this application, descriptions are provided by using an example in which SSID1 is the same as SSID2, that is, the router 1 and the router 2 are located in a same local area network. It should be noted that, as described above, all information in the table is obtained in the scanning phase, that is, the mobile phone can obtain information, such as an SSID, a BSSID, and a channel, based on a probe response message returned by the router. Optionally, after obtaining the foregoing information, the mobile phone saves the foregoing information in a cache. After successfully assessing the Wi-Fi2 network (5 GHz network) corresponding to the router 1 and the Wi-Fi1 network (2.4 GHz) corresponding to the router 2, the mobile phone writes network information corresponding to the Wi-Fi1 network and the Wi-Fi2 network into the list.

Referring to the scenario in FIG. 13, that is, after the user leaves home and then returns home again, the mobile phone accesses the 5 GHz network (Wi-Fi1 network) of the router 1. After the user moves into the room 4, when detecting that the signal of the current 5 GHz connection (that is, the Wi-Fi1 connection) is weak, the mobile phone initiates the Wi-Fi2 connection establishment process to access the 2.4 GHz network corresponding to the router 2.

For example, referring to FIG. 15, when initiating a Wi-Fi2 connection establishment process, the Wi-Fi2 module obtains, based on the BSSID (that is, BSSID2) of the currently accessed router 1, network information corresponding to BSSID2 from the database. For example, referring to Table 1, the corresponding network information obtained by the Wi-Fi2 module based on BSSID2 includes: SSID1, BSSID1, and a channel 1. Optionally, the Wi-Fi2 module may obtain the foregoing network information in the following way: the Wi-Fi2 inputs BSSID2 to the database, and the database searches the correspondence table based on BSSID2, and outputs successfully matched network information to the Wi-Fi2 module.

Figure 16:
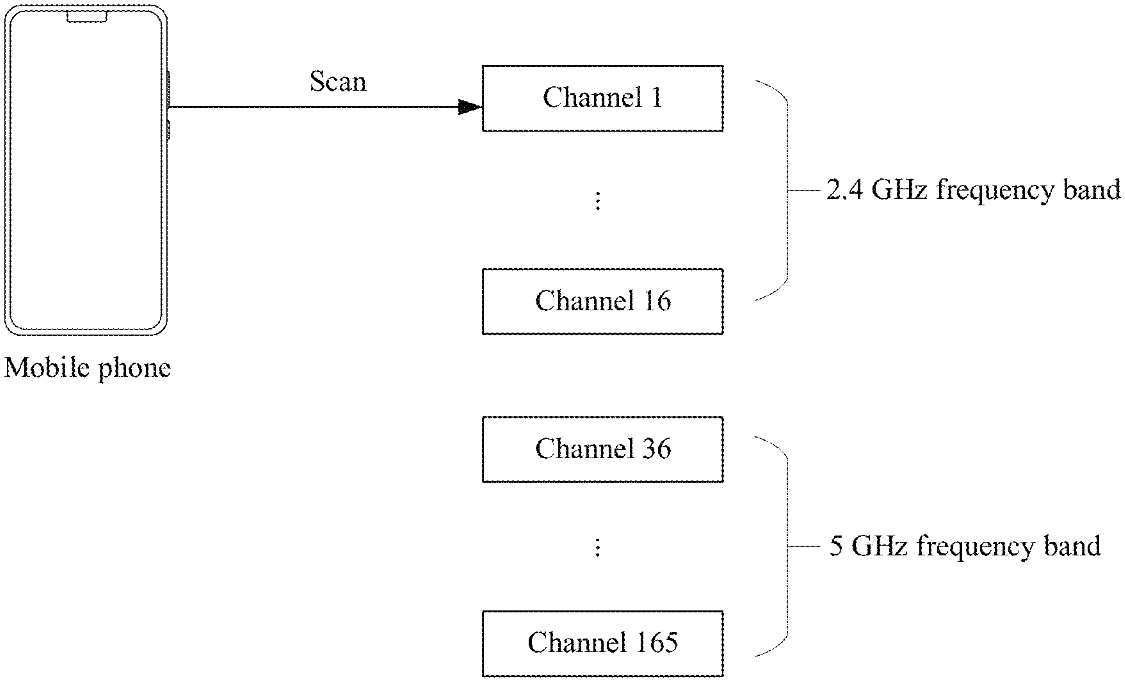
FIG. 16 illustrates a schematic diagram of channel scanning.

For example, after the Wi-Fi2 module obtains the foregoing network information, in the scanning phase of accessing Wi-Fi2, the Wi-Fi2 module scans the channel 1. As shown in FIG. 16, different from the full frequency band (referring to the 2.4 GHz or 5 GHz frequency band) in the Wi-Fi2 scanning phase described in FIG. 13 above, referring to FIG. 16, the mobile phone only needs to scan on the channel 1, that is, the mobile phone sends a probe request message only on the channel 1 to detect an accessible Wi-Fi network on the channel 1. For example, assuming that a network corresponding to the router 3 of a neighbor is an AAA network shown in FIG. 8, in this embodiment of this application, because the mobile phone only scans a specified channel (for example, the channel 1) in the scanning process of accessing Wi-Fi2, the mobile phone does not perceive the existence of the AAA network during the Wi-Fi2 access phase.

In an example, if the mobile phone finds an accessible Wi-Fi network on the channel 1 through scanning, the mobile phone performs a process of accessing this Wi-Fi network. For the specific process, refer to the description in FIG. 7. Details are not described herein again. Optionally, if the mobile phone fails to access the Wi-Fi2 network, the Wi-Fi2 module instructs the database to delete the correspondence between the network information of the Wi-Fi2 network and the network information of the Wi-Fi1 network, and re-executes the Wi-Fi2 access process. In the process of re-execution, in the scanning phase, the mobile phone scans channels in the 2.4 GHz frequency band other than the channel 1. Optionally, if the mobile phone accesses a new Wi-Fi2 network after re-executing the Wi-Fi2 access process, the Wi-Fi2 module writes network information of the new Wi-Fi2 network into the database, and the database stores a correspondence between the Wi-Fi1 network and the new Wi-Fi2 network, that is, the network information of the Wi-Fi1 network and the network information of the new Wi-Fi2 network are correspondingly recorded in the correspondence list.

In another example, if the mobile phone fails to find accessible Wi-Fi network on the channel 1 through scanning, the mobile phone scans channels in the 2.4 GHz frequency band other than the channel 1, and performs a subsequent access process based on the scanning result. For a specific process, refer to FIG. 7. For example, after the mobile phone successfully accesses the new Wi-Fi2 network, the correspondence list is updated, that is, the correspondence between the new Wi-Fi2 network and the Wi-Fi1 network is saved.

To sum up, in this embodiment of this application, by recording the correspondence between the Wi-Fi1 network and the Wi-Fi2 network, the mobile phone can scan a specified channel based on the recorded correspondence when accessing the Wi-Fi2 network, to reduce a time taken for the scanning phase and effectively improve the efficiency in accessing the Wi-Fi2, thereby reducing impact of the Wi-Fi1 connection in a frozen state on the user, and improving the user experience.

In a possible implementation, after the mobile phone successfully accesses the Wi-Fi1 and Wi-Fi2 networks, the Wi-Fi1 module may output both the network information of the Wi-Fi1 network and the network information (for example, Huawei2, AAA, and BBB networks) of the network that is found through scanning in the scanning phase to the database, and the Wi-Fi2 module outputs the network information of the Wi-Fi2 network to the database. Optionally, the database records the correspondences between the network information of the Wi-Fi1 network, the network information of the network that is found through scanning in the scanning phase, and the network information of the Wi-Fi2 network. For example, in a process in which the mobile phone accesses the Wi-Fi1 network again and initiates the Wi-Fi2 access process, the mobile phone may scan, based on the correspondence recorded in the database, channels corresponding to networks corresponding to Wi-Fi1 in the scanning phase.

Figure 17:
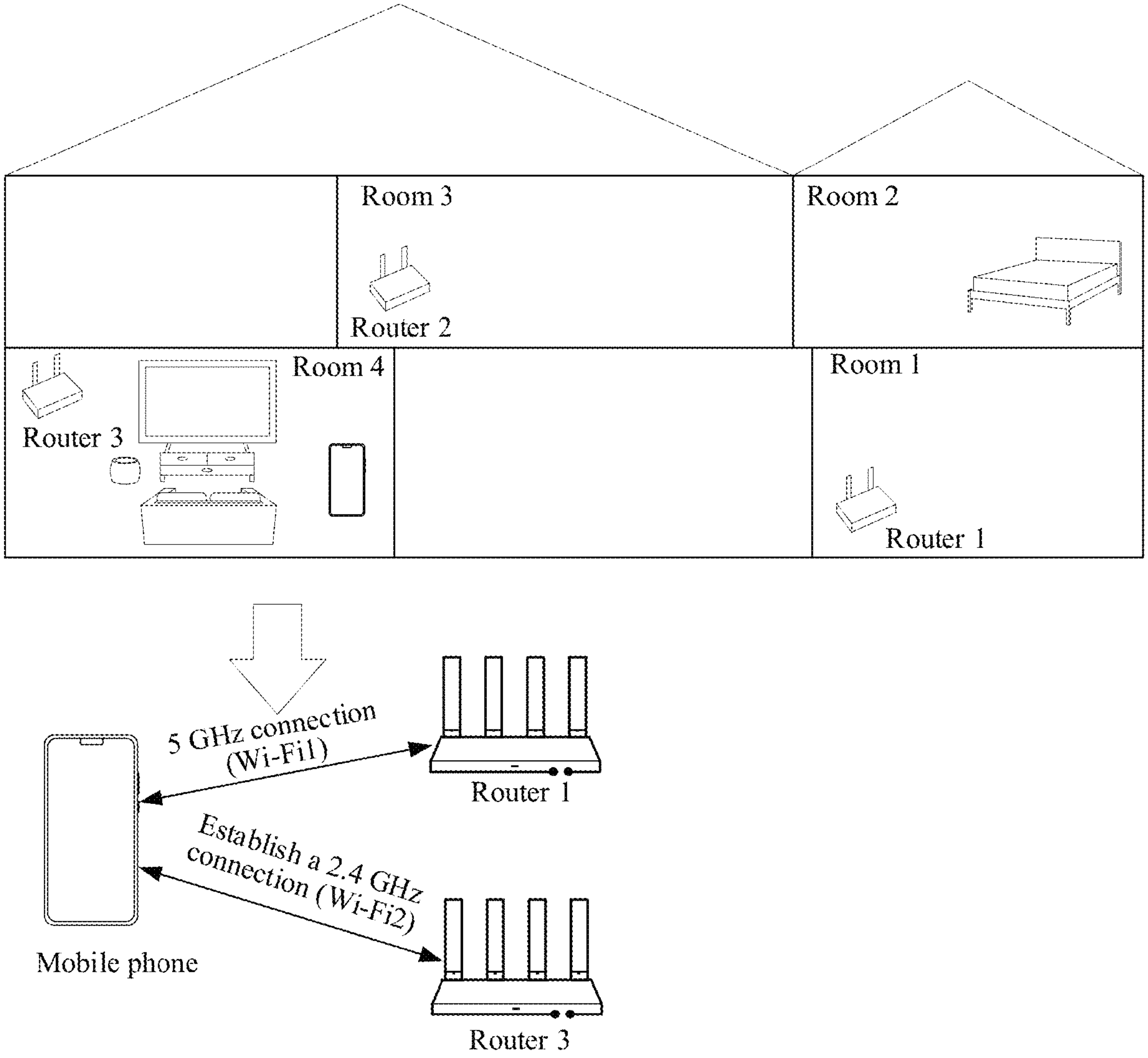
FIG. 17 illustrates a schematic diagram of an application scenario.

FIG. 17 is a schematic diagram of another exemplary application scenario. Referring to FIG. 17, for example, a router 3 is newly installed in the room 4, a network corresponding to the router 3 is a Huawei3 network, and the router 3 works on a channel 2 in the 2.4 GHz frequency band. In an example, according to related description in FIG. 15, that is, based on the recorded correspondence between the Huawei1 network of the router 1 and the Huawei2 network of the router 2, after accessing the router 1, the mobile phone accesses the router 2 by scanning the channel 1 (the channel on which Huawei2 works). Afterwards, the user may select a network (for example, the Huawei3 network) corresponding to the router 3 from an expandable network list in a network acceleration setting interface (refer to the description above). The mobile phone may disconnect the currently connected router 2 in response to the selection of the user, and access the router 3, that is, the Wi-Fi2 network is the Huawei3 network corresponding to the router 3. It should be noted that, when accessing the router 1 to scan the entire network band, the mobile phone may find the Huawei3 network corresponding to the router 3 through scanning. Therefore, the name of this network is included in the expandable network list. For example, a Wi-Fi1 network currently connected to the mobile phone is the Huawei1 network (corresponding to the router 1), an accessed Wi-Fi2 network is the Huawei3 network (corresponding to the router 3), and the mobile phone may record a correspondence between network information (including information such as a BSSID and a channel) of the Huawei1 network and network information of the Huawei3 network. For example, the mobile phone currently records two records corresponding to the Huawei1 network, including: the correspondence between the Huawei1 network (the router 1) and the Huawei2 network (the router 2), and the correspondence between the Huawei1 network (the router 1) and the Huawei3 network (the router 3). Optionally, if the user leaves home, the mobile phone is disconnected from the router 1 and the router 2. After the user returns home, the mobile phone automatically accesses the Huawei1 network (the router 1) (for the access process, reference may be made to the above, which is not described herein again). When needing to access a Wi-Fi2 network, based on the BSSID of the Huawei1 network, the mobile phone searches the correspondence list to obtain the channel (for example, the channel 1) on which the Huawei2 network works and the channel (for example, the channel 2) on which the Huawei3 network works. In the scanning phase, the mobile phone scans the channel 1 and the channel 2, and in the network selection phase, selects one of the Huawei2 network or the Huawei3 network according to the network selection condition described above for accessing. For other undescribed processes, refer to the steps in the embodiments of this application. Details are not described herein again.

Still referring to FIG. 17, in another example, as described above, correspondences between the router 1 and a plurality of networks that are found through scanning may be recorded in a correspondence record table of the mobile phone, that is, in the process of accessing the router 1, the mobile phone may find the Huawei2 network of the router 2 and the Huawei3 network of the router 3 through scanning, and record the correspondences between the Huawei1 network and networks that are found through scanning and that include the Huawei2 network and the Huawei3 network. For example, when accessing the Wi-Fi2, the mobile phone may scan the recorded channel on which the Huawei3 network corresponding to the Huawei1 works and the recorded channel on which the Huawei2 network corresponding to the Huawei1 works, and channels on which other corresponding networks work. Optionally, assuming that fingerprint database information (that is, historical connection information, including an account, a password, and the like) corresponding to the Huawei2 network and the Huawei3 network is stored in the mobile phone, the mobile phone may select one of the Huawei2 network or the Huawei3 network for accessing in the network selection phase. For other undescribed processes, refer to the steps in the embodiments of this application. Details are not described herein again.

It should be noted that, The Huawei3 network and the Huawei2 network may work on the same channel or different channels, which is not limited in this application.

Figure 18:
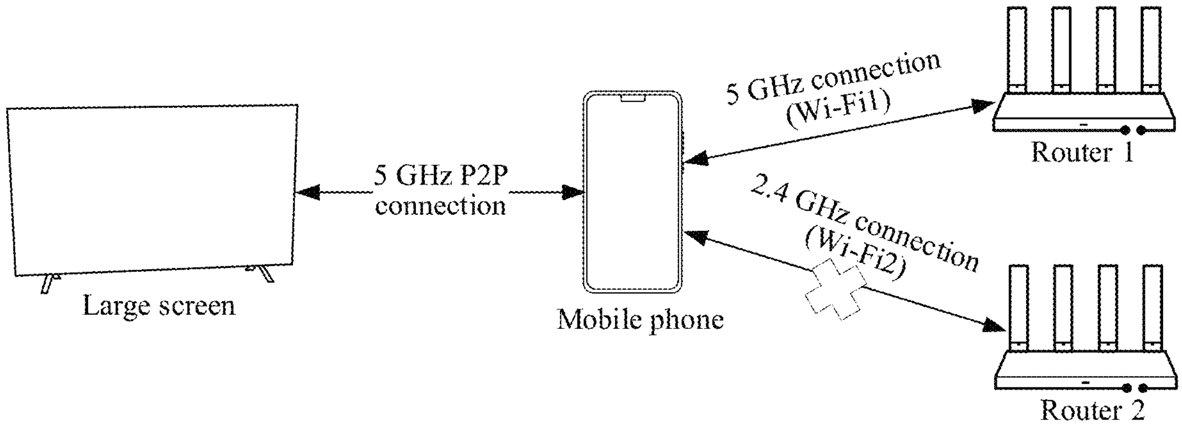
FIG. 18 illustrates a schematic diagram of an application scenario.

FIG. 18 illustrates a schematic diagram of an application scenario. Referring to FIG. 18, for example, after the mobile phone accesses the router 1 and the router 2, that is, accesses the 5 GHz network (Wi-Fi1 network) and the 2.4 GHz network (Wi-Fi2 network), the mobile phone may establish a P2P connection with a large screen to perform screen mirroring with the large screen. Optionally, the P2P connection may be a 5 GHz connection or a 2.4 GHz connection. In this embodiment of this application, descriptions are provided by using an example in which the mobile phone establishes a 5 GHz P2P connection with the large screen. For example, in the process in which the mobile phone establishes the 5 GHz P2P connection with the large screen, to ensure data transmission quality in the screen mirroring process, the mobile phone disconnects one of the two established Wi-Fi connections. For example, the mobile phone is disconnected from Wi-Fi2, that is, regardless of whether the Wi-Fi1 connection is a 5 GHz connection or a 2.4 GHz connection, the mobile phone is disconnected from Wi-Fi2. Optionally, in other embodiments, the mobile phone may also choose to disconnect one of the connections. For example, the mobile phone may choose to disconnect a connection in a frequency band the same as that of the P2P connection, or choose to disconnect a connection in a frequency band different from that of the P2P connection, which is not limited in this application. Optionally, when the P2P connection established between the mobile phone and the large screen is in a frequency band the same as that of one Wi-Fi1 connection between the mobile phone and the router, the channels may be the same or different, which is not limited in this application.

In a possible implementation, in addition to the scenario shown in FIG. 18 that may cause disconnection of Wi-Fi2, a Wi-Fi2 disconnection scenario may also be any one of the following: a network acceleration function is disabled, strength of a Wi-Fi2 signal is less than a threshold, Wi-Fi1 is disconnected, a WLAN is turned off, an application that needs network acceleration is closed, and the mobile phone is in an off-screen state. For example, when the network acceleration function is kept, if the mobile phone detects that the application that needs network acceleration is closed, the mobile phone may be disconnected from the Wi-Fi2 network and access the Wi-Fi network again after detecting again an application that requires network acceleration.

Figure 19:
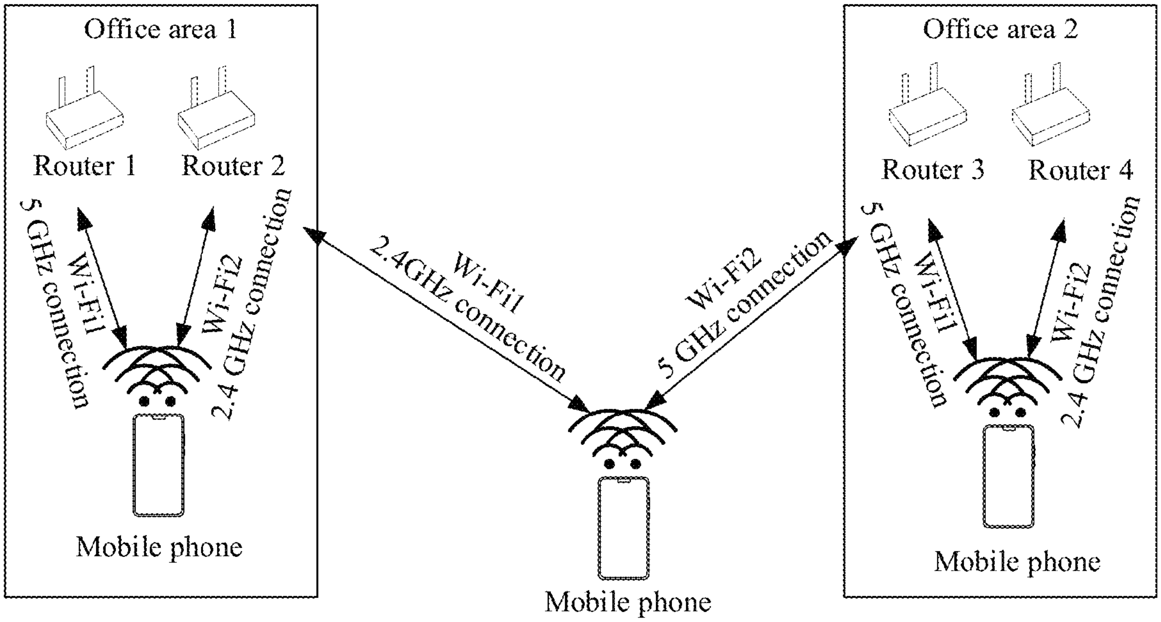
FIG. 19 illustrates a schematic diagram of an application scenario.

FIG. 19 illustrates a schematic diagram of another application scenario. Referring to FIG. 19, for example, a router 1 (corresponding to a 5 GHz network) and a router 2 (corresponding to a 2.4 GHz network) are disposed in an office area 1, and a router 3 (corresponding to the 5 GHz network) and a router 4 (corresponding to the 2.4 GHz network) are disposed in an office area 2. For example, a user holds a mobile phone in the office area 1. The mobile phone may access a Wi-Fi1 network (that is, the 5 GHz network corresponding to the router 1) and a Wi-Fi2 network (that is, the 2.4 GHz network corresponding to the router 2) based on the implementation described in the embodiments of this application. The user moves to the office area 2 with the mobile phone. During the movement, the mobile phone detects that the signal strength of the Wi-Fi1 network, that is, the 5 GHz network corresponding to the router 1, is less than a threshold. For example, the mobile phone is disconnected from the router 1 while maintaining a connection with the router 2. After the disconnection, the 2.4 GHz network corresponding to the router 2 becomes the Wi-Fi1 network. For example, the mobile phone may access the router 3, to establish a Wi-Fi2 connection, that is, a 5 GHz connection with the router 3. For example, when the user moves into the office area 2, or before the user moves into the office area 2, the mobile phone detects that a signal of the 2.4 GHz network (that is, the current Wi-Fi1 network) corresponding to the router 2 is less than the threshold. For example, the mobile phone is disconnected from the router 2 while maintaining a connection with the router 3. After the disconnection, the 5 GHz network corresponding to the router 3 becomes the Wi-Fi1 network. For example, the mobile phone may access the router 4, to establish a Wi-Fi2 connection, that is, a 2.4 GHz connection with the router 4. It should be noted that, for each access process in this scenario, refer to the access process in the embodiments of this application. Details are not described herein again. In the scenario shown in FIG. 19, the user moves from the office area 1 to the office area 2 with the mobile phone. Since the mobile phone can always maintain one or two connections, the mobile phone may always remain connected, to ensure the connectivity of service transmission and further improve the user experience.

Figure 20:
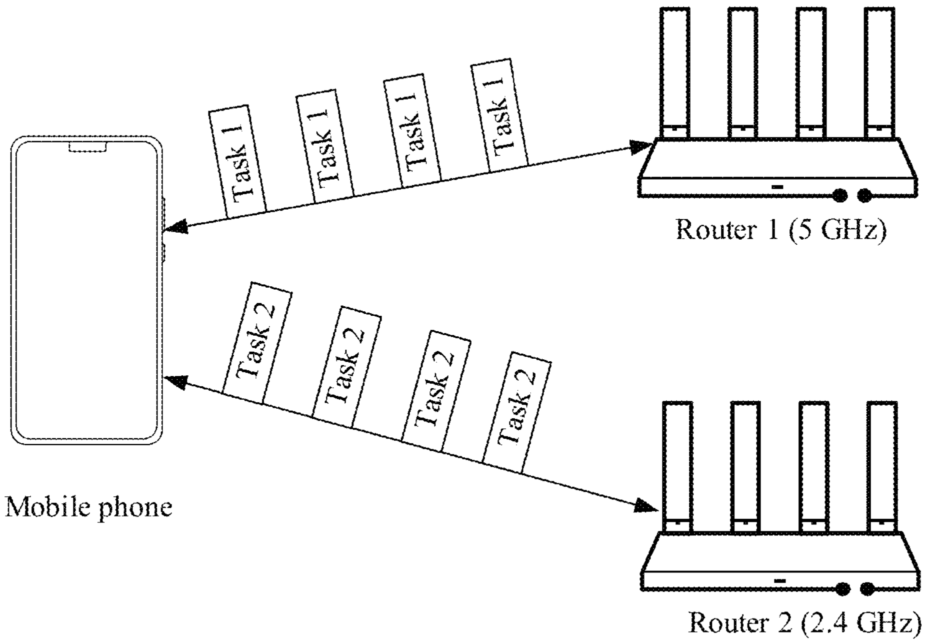
FIG. 20 is a schematic diagram of a data transmission manner.

In a possible implementation, after the mobile phone accesses the router 1 and the router 2, manners in which the mobile phone interacts with the router 1 and the router 2 may be divided into two types. In one manner, data transmission is performed only on one connection with a smaller latency in the two connections. In the other manner, data transmission is performed concurrently on the two connections. Optionally, during concurrent data transmission, data transmitted on the two connections may be the same or different. For example, in an example, when the user uses a game application in the mobile phone, if the data transmission latency of the 5 GHz connection is relatively large, the mobile phone may initiate a Wi-Fi2 access process to access the 2.4 GHz network. After the mobile phone accesses the 2.4 GHz network, the data transmitted on the 5 GHz connection may be transferred to the 2.4 GHz network for transmission, to reduce the data transmission latency. In another example, FIG. 20 illustrates another data transmission manner. Referring to FIG. 20, in a process of running a download application on the mobile phone, if the download application performs a plurality of download tasks, for example, including a download task 1 and a download task 2, after the mobile phone accesses the router 1 and the router 2, data transmission is performed on the 5 GHz connection and the 2.4 GHz connection simultaneously. For example, data corresponding to the download task 1 is transmitted on the 5 GHz connection, and data corresponding to the download task 2 is transmitted on the 2.4 GHz connection. It should be noted that, the data transmission manner in FIG. 20 is only a schematic example, and does not impose a limitation in this application.

Optionally, as described above, the network acceleration setting option may include an application list of one or more supported applications. For example, when detecting that an application in the application list is run, the mobile phone may perform the foregoing two data transmission manners on the application in the application list, to ensure the transmission efficiency of the data corresponding to the application in the application list. For an application that is not in the application list, transmission may be kept on the Wi-Fi1 connection, for example, the 5 GHz connection with the router 1.

Figure 21:
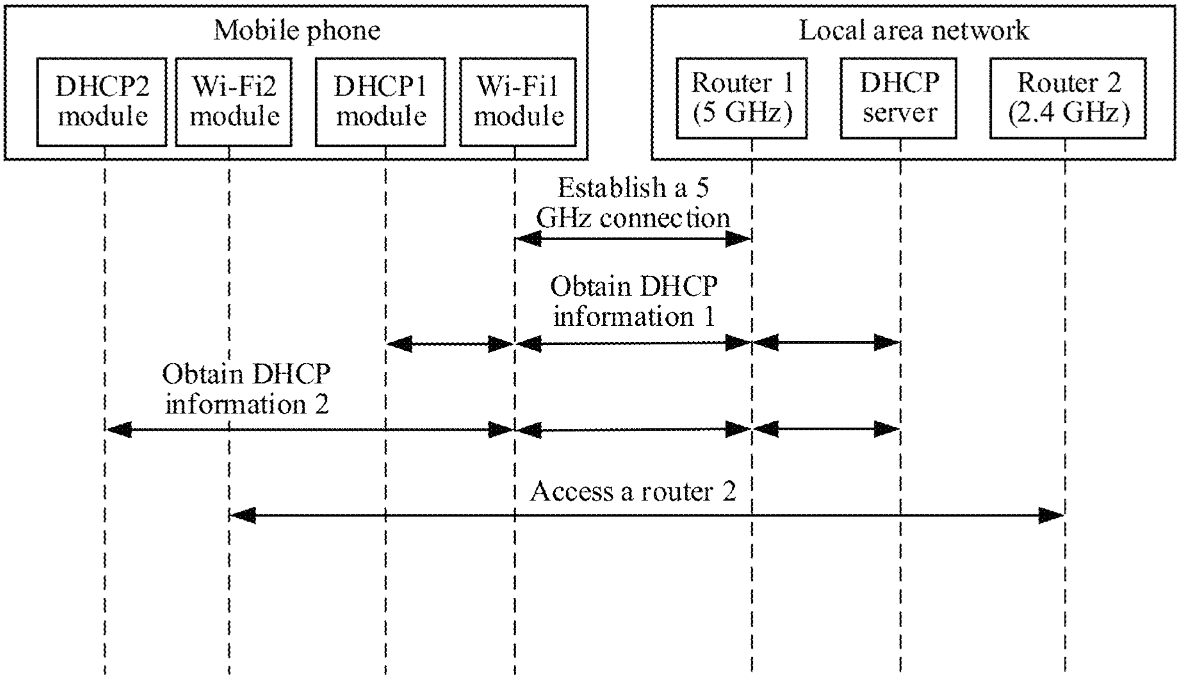
FIG. 21 is a schematic diagram of a DHCP process according to an embodiment of this application.

Referring to FIG. 7, as described above, after accessing the router, the mobile phone needs to perform a DHCP process to obtain corresponding DHCP information, so as to have a network access capability. That is, in a process of accessing Wi-Fi2, after accessing Wi-Fi2, the mobile phone further needs to obtain the DHCP information. The DHCP process also increases a duration taken for the mobile phone to access the Wi-Fi2 network. This application provides a manner of obtaining DHCP information, and further reduces the duration taken for a mobile phone to access a Wi-Fi2 network. FIG. 21 illustrates a schematic diagram of a DHCP process. Referring to FIG. 21, for example, after the mobile phone establishes a 5 GHz connection with a router 1 through a Wi-Fi1 module, a DHCP1 module initiates the DHCP process. Specifically, the DHCP1 module may obtain DHCP information 1 from a DHCP server through the 5 GHz connection between the Wi-Fi1 module and the router 1. The DHCP information 1 includes IP address information, subnet mask information, and the like that are allocated by the DHCP server to the DHCP1 module. For example, after the Wi-Fi1 module has a network access capability, that is, after the DHCP process is performed, a DHCP2 module may obtain DHCP information 2 from the DHCP server through the 5 GHz connection between the Wi-Fi1 module and the router 1. The DHCP information 2 includes IP address information, subnet mask information, and the like that are allocated by the DHCP server to the DHCP2 module. Then, after accessing a router 2, a Wi-Fi2 module may access a network through a 2.4 GHz connection with the router 2 based on the DHCP information 2 obtained by the DHCP2 module, to omit the DHCP process in a Wi-Fi2 access process.

Figure 22:
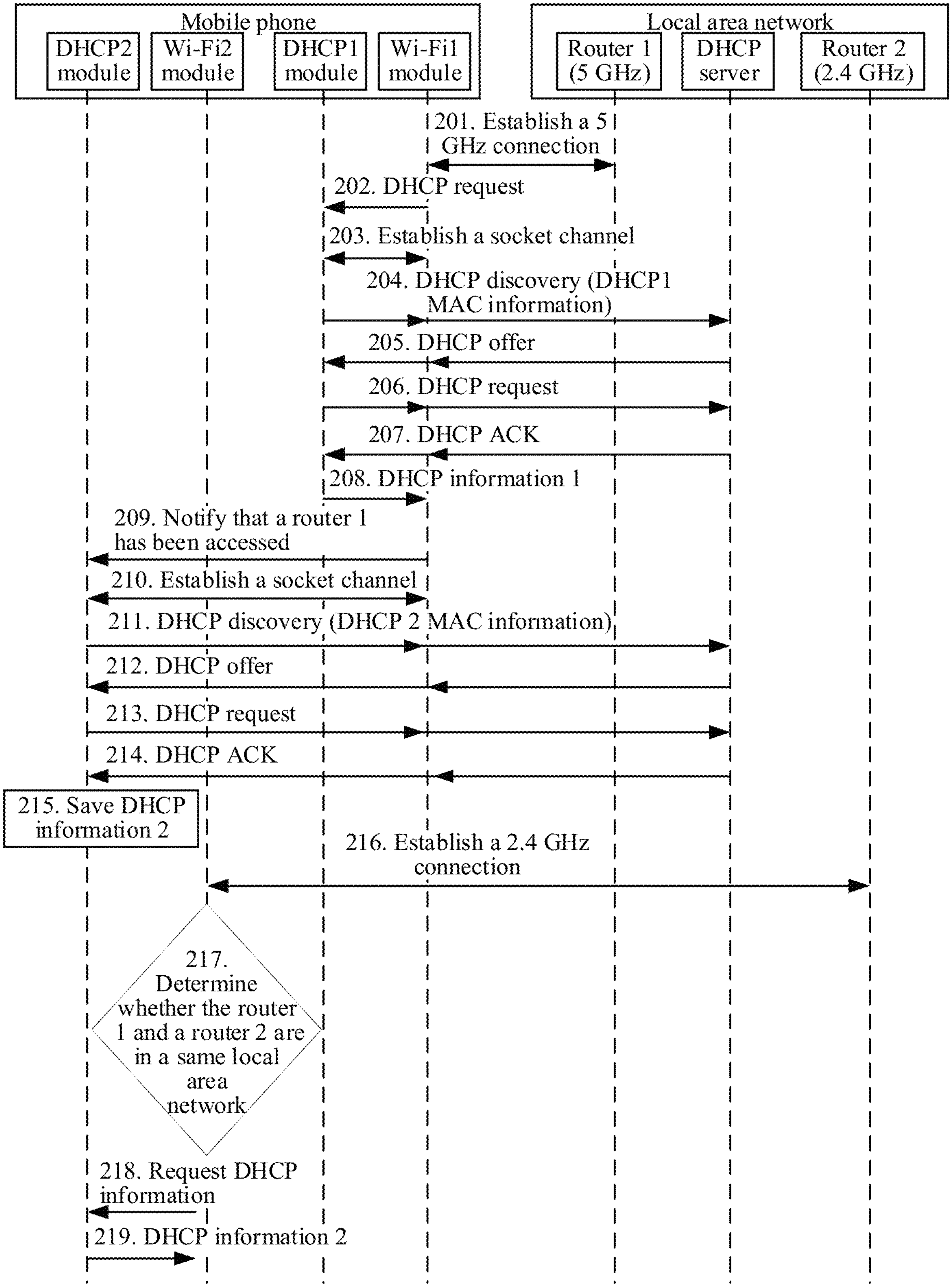
FIG. 22 is a schematic diagram of a DHCP process according to an embodiment of this application.

The DHCP process in FIG. 21 is described below in detail with reference to a schematic diagram of a DHCP process shown in FIG. 22. Referring to FIG. 22, the details include:

S201. A Wi-Fi1 module establishes a 5 GHz connection with a router 1.

For example, for the manner in which the Wi-Fi1 module and a Wi-Fi2 module described below establish connections with routers, refer to the foregoing. Details are not described herein again.

S202. The Wi-Fi1 module sends a DHCP request to a DHCP1 module.

For example, the Wi-Fi1 module sends the DHCP request to the DHCP1 module, to instruct to initiate a DHCP process.

S203. The DHCP1 module establishes a socket channel with the Wi-Fi1 module.

For example, that the DHCP1 module establishes the socket channel with the Wi-Fi1 module may also be understood as binding the DHCP1 module and the Wi-Fi1 module.

S204. The DHCP1 module sends a DHCP discovery message to the Wi-Fi1 module, and the Wi-Fi1 module sends the DHCP discovery message to a DHCP server.

For example, the DHCP1 module sends the DHCP discovery message to the Wi-Fi1 module, where the message carries MAC information of the DHCP1 module. The Wi-Fi1 module forwards the message to the DHCP server.

S205. The DHCP server sends a DHCP offer message to the Wi-Fi1 module, and the Wi-Fi1 module sends the DHCP offer message to the DHCP1 module.

For example, the DHCP server allocates the corresponding DHCP information 1 based on the MAC information of the DHCP1 module, adds the DHCP information 1 to the DHCP offer message, and sends the DHCP offer message to the Wi-Fi1 module. The Wi-Fi1 module forwards the DHCP offer message to the DHCP1 module.

S206. The DHCP1 module sends a DHCP request message to the Wi-Fi1 module, and the Wi-Fi1 module sends the DHCP request message to the DHCP server.

S207. The DHCP server sends a DHCP ACK message to the Wi-Fi1 module, and the Wi-Fi1 module sends the DHCP ACK message to the DHCP1 module.

For the specific steps of S206 to S207, refer to the description in FIG. 7. Details are not described herein again.

S208. The DHCP1 module outputs the DHCP information 1 to the Wi-Fi1 module.

For example, the Wi-Fi1 module may access a network through the 5 GHz connection with the router 1 based on DHCP information 1.

It should be noted that, after the DHCP1 module establishes the socket channel with the Wi-Fi1 module, the DHCP1 module and the Wi-Fi1 module perform transmission of messages through this channel, for example, the DHCP discovery message, the DHCP offer message, the DHCP request message, and the DHCP ACK message.

S209. The Wi-Fi1 module notifies a DHCP2 module that the router 1 has been accessed.

S210. The DHCP2 module establishes a socket channel with the Wi-Fi1 module.

For example, that the DHCP2 module establishes the socket channel with the Wi-Fi1 module may also be understood as binding the DHCP2 module and the Wi-Fi1 module.

S211. The DHCP2 module sends a DHCP discovery message to the Wi-Fi1 module, and the Wi-Fi2 module sends the DHCP discovery message to the DHCP server.

For example, the DHCP2 module sends the DHCP discovery message to the Wi-Fi1 module, where the message carries MAC information of the DHCP2 module. The Wi-Fi1 module forwards the message to the DHCP server.

S212. The DHCP server sends a DHCP offer message to the Wi-Fi1 module, and the Wi-Fi1 module sends the DHCP offer message to the DHCP2 module.

For example, the DHCP server allocates the corresponding DHCP information 2 based on the MAC information of the DHCP2 module, adds the DHCP information 2 to the DHCP offer message, and sends the DHCP offer message to the Wi-Fi1 module. The Wi-Fi1 module forwards the DHCP offer message to the DHCP2 module.

S213. The DHCP2 module sends a DHCP request message to the Wi-Fi1 module, and the Wi-Fi1 module sends the DHCP request message to the DHCP server.

S214. The DHCP server sends a DHCP ACK message to the Wi-Fi1 module, and the Wi-Fi1 module sends the DHCP ACK message to the DHCP2 module.

S215. The DHCP2 module saves the DHCP information 2.

S216. The Wi-Fi2 module establishes a 2.4 GHz connection with a router 2.

S217. The Wi-Fi2 module determines whether the router 1 and the router 2 are in a same local area network.

For example, in the process in which the Wi-Fi2 module establishes the 2.4 GHz connection with the router 2, the Wi-Fi2 module obtains information, such as an SSID and a BSSID, of the router 2.

Optionally, the Wi-Fi2 module may determine that the router 1 and the router 2 are in the same local area network through any one of the following manners:

1) An SSID of the router 1 is the same as an SSID of the router 2.
2) A BSSID of the router 1 is similar to a BSSID of the router 2, where that the BSSIDs are similar may optionally be that the first 10 bits of the BSSID of the router 1 are the same as those of the BSSID of the router 2.
3) The Wi-Fi2 module can communicate with the DHCP server. For example, the Wi-Fi2 module may send an ARP probe message to the DHCP server through the 2.4 GHz connection between the Wi-Fi2 module and the router 2. If an ARP response message returned by the DHCP server is received, it means that the Wi-Fi2 module can communicate with the DHCP server. In other embodiments, whether the Wi-Fi2 can communicate with the DHCP server may be detected in another detection manner, which is not limited in this application.

Optionally, if the Wi-Fi2 module determines that the router 1 and the router 2 are in the same local area network, S218 is performed. If the Wi-Fi2 module determines that the router 1 and the router 2 are not in the same local area network, the Wi-Fi2 module instructs the DHCP2 module to initiate the DHCP process. For a specific process, refer to S202 to S208. Details are not described herein again.

S218. The Wi-Fi2 module requests DHCP information from the DHCP2 module.

S218. The DHCP2 module outputs DHCP information 2 to the Wi-Fi2 module.

For example, the Wi-Fi2 module may access a network through the 2.4 GHz connection with the router 2 based on the DHCP information 2.

It may be understood that to implement the foregoing functions, the electronic device includes corresponding hardware and/or software modules for implementing the functions. Algorithm steps in the examples described with reference to the embodiments disclosed in this specification can be implemented by hardware or a combination of hardware and computer software in this application. Whether a function is implemented by hardware or computer software driving hardware depends on particular applications and design constraints of the technical solutions. A person skilled in the art may use different methods to implement the described functions for each particular application with reference to the embodiments, but such an implementation should not be considered as exceeding the scope of this application.

Figure 23:
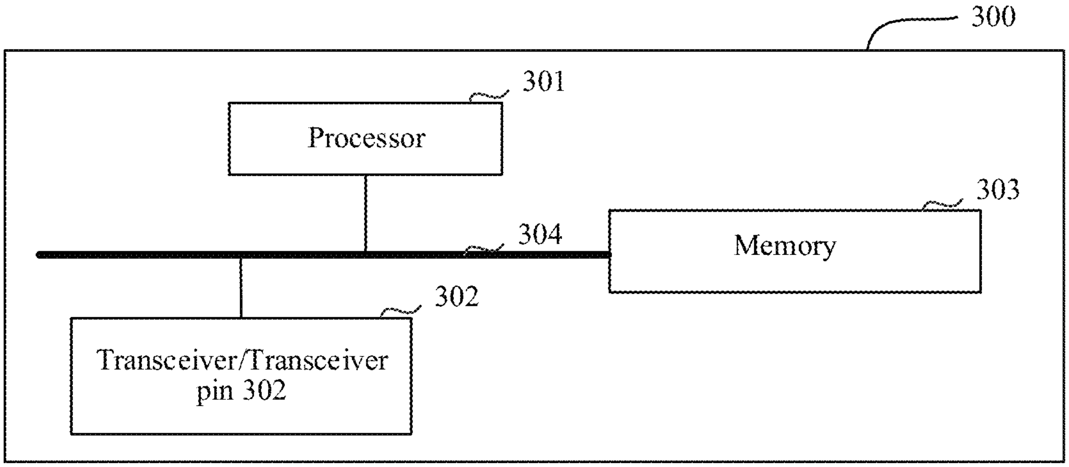
FIG. 23 is a schematic structural diagram of an apparatus according to an embodiment of this application.

In an example, FIG. 23 is a schematic block diagram of an apparatus 300 according to an embodiment of this application. The apparatus 300 may include a processor 301 and a transceiver/transceiver pin 302, and optionally further include a memory 303.

All the components of the apparatus 300 are coupled together by a bus 304. In addition to a data bus, the bus 304 further includes a power bus, a control bus, and a status signal bus. However, for the purpose of clear description, various buses are all referred to as the bus 304 in the figure.

Optionally, the memory 303 may be configured to store instructions in the foregoing method embodiments. The processor 301 may be configured to execute the instructions in the memory 303, control a receive pin to receive signals, and control a transmit pin to send signals.

The apparatus 300 may be the electronic device or the chip of the electronic device in the foregoing method embodiments.

All related content of the steps in the foregoing method embodiments may be referenced to function descriptions of corresponding functional modules. Details are not described herein again.

An embodiment further provides a computer storage medium. The computer storage medium stores a computer instruction, and when the computer instruction is run on an electronic device, the electronic device is enabled to perform the related method steps, to implement the dual Wi-Fi connection method in the foregoing embodiment.

An embodiment further provides a computer program product. When the computer program product runs on a computer, the computer is enabled to perform the related steps, to implement the dual Wi-Fi connection method in the foregoing embodiment.

In addition, an embodiment of this application further provides an apparatus. The apparatus may be specifically a chip, a component, or a module. The apparatus may include a processor and a memory that are connected. The memory is configured to store a computer executable instruction, and when the apparatus runs, the processor may execute the computer executable instruction stored in the memory, so that the chip performs the dual Wi-Fi connection method in the foregoing method embodiments.

The electronic device, the computer storage medium, the computer program product, or the chip provided in this embodiment may be configured to perform the corresponding method provided above. Therefore, for beneficial effects that can be achieved, refer to the beneficial effects of the corresponding method provided above. Details are not described herein again.

Through the descriptions of the foregoing implementations, a person skilled in the art may understand that, for the purpose of convenient and brief description, only division of the foregoing function modules is used as an example for description. In actual application, the foregoing functions may be allocated to and completed by different function modules according to requirements. That is, an internal structure of an apparatus is divided into different function modules to complete all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to an actual requirement to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

Both any content of embodiments of this application and any content of a same embodiment may be freely combined. Any combination of the foregoing content is within the scope of this application.

When the integrated unit is implemented in the form of a software function unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, a compact disc, or the like.

Although the embodiments of this application have been described above with reference to the accompanying drawings, this application is not limited to the specific embodiments described above, and the specific embodiments described above are merely exemplary and not limitative. A person of ordinary skill in the art may make various variations under the teaching of this application without departing from the spirit of this application and the protection scope of the claims, and such variations shall all fall within the protection scope of this application.

Methods or algorithm steps described in combination with the content disclosed in the embodiments of this application may be implemented by hardware, or may be implemented by a processor by executing a software instruction. The software instruction may include a corresponding software module. The software module may be stored in a random access memory (Random Access Memory, RAM), a flash memory, a read-only memory (Read Only Memory, ROM), an erasable programmable read only memory (Erasable Programmable ROM, EPROM), an electrically erasable programmable read only memory (Electrically EPROM, EEPROM), a register, a hard disk, a mobile hard disk, a compact disc read-only memory (CD-ROM), or a storage medium in any other forms well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in the network device. Certainly, the processor and the storage medium may alternatively exist in the network device as discrete assemblies.

A person skilled in the art should be aware that in the foregoing one or more examples, functions described in the embodiments of this application may be implemented by hardware, software, firmware, or any combination thereof. When implemented by using software, the functions can be stored in a computer-readable medium or can be used as one or more instructions or code in a computer-readable medium for transferring. The computer-readable medium includes a computer storage medium and a communication medium, where the communication medium includes any medium that enables a computer program to be transmitted from one place to another. The storage medium may be any available medium accessible to a general-purpose or dedicated computer.

Although the embodiments of this application have been described above with reference to the accompanying drawings, this application is not limited to the specific embodiments described above, and the specific embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A dual Wi-Fi connection method, applied to a first electronic device, the method comprising:

establishing a connection with a first access point through a first Wi-Fi connection;

obtaining first Dynamic Host Configuration Protocol (DHCP) information from a DHCP server through the first Wi-Fi connection;

obtaining second DHCP information from the DHCP server through the first Wi-Fi connection;

establishing a connection with a second access point through a second Wi-Fi connection;

exchanging data with the second access point based on the second DHCP information, wherein the second DHCP information is different from the first DHCP information.

2. The method according to claim 1, wherein the first DHCP information is subnet mask information or IP address information allocated by the DHCP server to a DHCP1 module of the first electronic device.

3. The method according to claim 1, wherein, before the first electronic device establishes the second Wi-Fi connection with the second access point, searching for network information of the second access point based on network information of the first access point;

establishing the second Wi-Fi connection between the first electronic device and the second access point includes, establishing the second Wi-Fi connection with the second access point based on the searched network information of the second access point.

4. The method according to claim 3, wherein the network information of the first access point or of the second access point comprises at least one of the following: basic service set identification BSSID information, service set identification SSID information, or channel information of a channel to which it belongs.

5. The method according to claim 1, further comprising:

establishing a third Wi-Fi connection with a second electronic device in response to a received first operation, and performing a screen mirroring service with the second electronic device through the third Wi-Fi connection; and disconnecting the second Wi-Fi connection.

6. The method according to claim 1, characterized in that:

running a first application in response to a received second operation; and performing transmission of data of the first application over the second Wi-Fi connection, or over the first Wi-Fi connection and the second Wi-Fi connection.

7. The method according to claim 1, wherein establishing the connection with the second access point through the second Wi-Fi connection is performed according to an association relationship between the first access point and the second access point when an access condition is met, wherein the access condition comprises at least one of the following:

in a case that a third operation is received, the third operation is used for instructing to establish the second Wi-Fi connection while maintaining the first Wi-Fi connection;

a communication quality parameter of the first Wi-Fi connection is lower than a threshold; and the first electronic device runs a specified application.

8. The method according to claim 1, wherein the first Wi-Fi connection is established on a first channel in a first frequency band, and the second Wi-Fi connection is established on a second channel in a second frequency band, wherein the first frequency band is the same as or different from the second frequency band.

9. The method according to claim 1, wherein the first access point and the second access point are a same device, and the device is a dual-band integrated router.

10. The method according to claim 1, wherein the first access point and the second access point are different devices.

11. An electronic device, comprising:

a memory and a processor, wherein the memory is coupled to the processor, the memory stores program instructions, and when executed by the processor, the program instructions cause the electronic device to perform operations comprising:

establishing a connection with a first access point through a first Wi-Fi connection;

obtaining first Dynamic Host Configuration Protocol (DHCP) information from a DHCP server through the first Wi-Fi connection;

obtaining second DHCP information from the DHCP server through the first Wi-Fi connection;

establishing a connection with a second access point through a second Wi-Fi connection;

exchanging data with the second access point based on the second DHCP information, wherein the second DHCP information is different from the first DHCP information.

12. The electronic device according to claim 11, wherein the first DHCP information is subnet mask information or IP address information allocated by the DHCP server to a DHCP1 module of the electronic device.

13. The electronic device according to claim 11, wherein, before the electronic device establishes the second Wi-Fi connection with the second access point, searching for network information of the second access point based on network information of the first access point;

establishing the second Wi-Fi connection between the electronic device and the second access point includes, establishing the second Wi-Fi connection with the second access point based on the searched network information of the second access point.

14. The electronic device according to claim 11, wherein the network information of the first access point or of the second access point comprises at least one of the following: basic service set identification BSSID information, service set identification SSID information, or channel information of a channel to which it belongs.

15. The electronic device according to claim 11, further comprising:

establishing a third Wi-Fi connection with a second electronic device in response to a received first operation, and performing a screen mirroring service with the second electronic device through the third Wi-Fi connection; and disconnecting the second Wi-Fi connection.

16. The electronic device according to claim 11, characterized in that:

running a first application in response to a received second operation; and performing transmission of data of the first application over the second Wi-Fi connection, or over the first Wi-Fi connection and the second Wi-Fi connection.

17. The electronic device according to claim 11, wherein establishing the connection with the second access point through the second Wi-Fi connection is performed according to an association relationship between the first access point and the second access point when an access condition is met, wherein the access condition comprises at least one of the following:

in a case that a third operation is received, the third operation is used for instructing to establish the second Wi-Fi connection while maintaining the first Wi-Fi connection;

a communication quality parameter of the first Wi-Fi connection is lower than a threshold; and the first electronic device runs a specified application.

18. The electronic device according to claim 11, wherein the first Wi-Fi connection is established on a first channel in a first frequency band, and the second Wi-Fi connection is established on a second channel in a second frequency band, wherein the first frequency band is the same as or different from the second frequency band.

19. The electronic device according to claim 11, wherein the first access point and the second access point are a same device, and the device is a dual-band integrated router.

20. A non-transitory computer-readable medium storing instructions that, when executed by a processor of an electronic device, causes the electronic device to perform operations comprising:

establishing a connection with a first access point through a first Wi-Fi connection;

obtaining first Dynamic Host Configuration Protocol (DHCP) information from a DHCP server through the first Wi-Fi connection;

obtaining second DHCP information from the DHCP server through the first Wi-Fi connection; and establishing a connection with a second access point through a second Wi-Fi connection;

exchanging data with the second access point based on the second DHCP information, wherein the second DHCP information is different from the first DHCP information.

* * * * *